United States Patent [19]

Paddock

[11] Patent Number: 4,490,986
[45] Date of Patent: Jan. 1, 1985

[54] ELECTRONIC SENSING AND DISPLAY SYSTEM FOR A REFRIGERATOR

[75] Inventor: Stephen W. Paddock, Knight Township, Vanderburgh County, Ind.

[73] Assignee: Whirlpool Corporation, Benton Harbor, Mich.

[21] Appl. No.: 450,487

[22] Filed: Dec. 16, 1982

Related U.S. Application Data

[62] Division of Ser. No. 255,673, Apr. 20, 1981, Pat. No. 4,387,578.

[51] Int. Cl.³ .............................................. F25B 49/00
[52] U.S. Cl. ..................................... 62/127; 340/527
[58] Field of Search .......................... 62/126, 129, 127; 165/11 R; 236/94; 340/527, 521, 870.17, 870.11

[56] References Cited

U.S. PATENT DOCUMENTS

| | | |
|---|---|---|
| 2,696,604 | 12/1954 | Markow et al. . |
| 3,100,383 | 8/1963 | Foster et al. . |
| 3,234,533 | 2/1966 | Poli . |
| 3,277,458 | 10/1966 | Greenwood . |
| 3,665,399 | 5/1972 | Zehr et al. . |
| 3,743,009 | 7/1973 | Dagerford ............................ 165/11 |
| 3,757,323 | 9/1973 | Pintell . |
| 3,940,739 | 2/1976 | Quimet . |
| 3,959,787 | 5/1976 | Messmann et al. . |
| 3,984,825 | 10/1976 | Fujita . |
| 4,038,061 | 7/1977 | Anderson et al. . |
| 4,109,235 | 8/1978 | Bouthors . |
| 4,146,884 | 3/1979 | Kurn . |
| 4,195,500 | 4/1980 | Tobita et al. . |
| 4,381,549 | 4/1983 | Stamp, Jr. et al. ................ 165/11 R |
| 4,387,368 | 6/1983 | Day et al. .............................. 62/129 |

Primary Examiner—William E. Wayner
Attorney, Agent, or Firm—Wood, Dalton, Phillips, Mason & Rowe

[57] ABSTRACT

A sensing and display system for a refrigerator includes a plurality of sensors which are sequentially monitored at a first rate in order to determine whether certain conditions in the refrigerator are within predetermined ranges. If the sensed conditions are within their ranges, a first plurality of visual indicators are sequentially energized at a second rate and a separate indicator is continuously energized to indicate normal operating conditions. If the system detects that one or more of the sensed conditions are not within their ranges, the first plurality of indicators and the separate indicator are de-energized, and one or more of a second plurality of indicators are energized to inform the user of the existence of one or more abnormal operating conditions. The system delays an abnormal condition indication, such as an overtemperature condition, until the condition has existed for a predetermined period of time. The system also provides separate and distinct indications for a presently existing overtemperature condition and a previous overtemperature condition which has since disappeared.

16 Claims, 19 Drawing Figures

ELECTRONIC SENSING AND DISPLAY SYSTEM FOR A REFRIGERATOR

This is a division of application Ser. No. 225,673 filed Apr. 20, 1981, now U.S. Pat. No. 4,387,578 issued June 14, 1983.

BACKGROUND OF THE INVENTION

This invention relates to an electronic sensing and display system for use in a temperature controlled device, such as a refrigerator. The sensing and display system monitors various sensed conditions and indicates the status of the sensed conditions to the user through the use of visual and audible indicating means.

It has been found desirable to inform a user of the status of various operating conditions in a refrigerator. By providing an indication of the status of these sensed conditions, the user is alerted to the existence of an abnormal condition which may result in a loss of food quality, or even food spoilage.

Furthermore, the existence of an abnormal condition within the refrigerator may indicate that an equipment malfunction has occurred. In such a case, it is desirable to alert the user as to the existence of such a malfunction so that corrective maintenance can be effected without undue delay.

It has also been found expedient to not only indicate the present existence of an abnormal condition, but to indicate whether the abnormal condition has existed for greater than a particular length of time. Moreover, it is desirable to provide a positive indication of whether an abnormal condition has previously occurred, but has since disappeared. An example of such an abnormal condition is an overtemperature occurrence within the refrigerated airspace of longer than a predetermined length of time. In such a case, food spoilage may have resulted, even though the temperature within the refrigerator has since returned to normal levels. Such a condition, if not indicated, may result in the consumption of spoiled food, which obviously should be avoided.

In some prior refrigerator sensing and indicating systems, a visual indication is provided when an overtemperature condition is sensed. Some of these types of systems provide an additional indication whenever the overtemperature condition has existed for longer than a predetermined period. Other systems of this type require acknowledgement, i.e. manual intervention, by the user before the system can be returned to its normal state. However, these types of systems do not provide a separate indication that a previous overtemperature condition has occurred, but that the condition has since disappeared so that the refrigerator has returned to normal operating temperature levels. Consequently, such systems do not indicate whether or not the overtemperature condition is still in existence.

Other types of sensing and indicating systems have utilized scanning apparatus to sequentially scan and indicate the status of various sensors. In one such system, the scanning operation is stopped automatically when an alarm condition is detected, so as to indicate which sensor is registering an abnormal condition. However, such types of systems suffer from the disadvantage of scanning the sensors and the indicators at the same time and rate, which may result in an abnormal condition being undetected while another abnormal condition is being indicated.

A still further type of monitoring and display system concurrently scans a first number of sensors while continuously sensing a second number of sensors. The status of each of the first group of sensors is sequentially displayed at the same time and at the same rate as the scanning rate. If one of the continuously sensed conditions assumes an abnormal value, the scanning is interrupted and the status of the continuously sensed condition is immediately displayed.

In still another type of sensing and display system, a number of test points are scanned and a visual indication of the status of each test point is concurrently actuated. In addition to these indicators, the display panel includes a run light which flashes each time data is sent to the display unit. The sequential energization rate of the visual indicators, however, is synchronized to the actual sensor scanning rate itself.

These and other types of sensing and display systems do not disclose the use of a display having a series of sequentially energized scanning indicators which provide a general indication that sensor scanning is taking place, together with a plurality of separate warning indicators that are energized only when an abnormal condition is sensed, and in which the sensor scanning operation continues even when the existence of an abnormal condition has been indicated.

SUMMARY OF THE INVENTION

In accordance with the present invention, an electronic sensing and display system for a refrigerator or the like senses a plurality of operating conditions of the refrigerator and provides both an indication that sensor scanning is taking place and an indication of whether one or more sensed conditions are within their predetermined ranges.

The operating conditions sensed by the system include the position of a plurality of door switches, the temperature within the fresh food compartment and the accumulated time since the system was initially energized or reset. This information is used to operate indicators and alarms indicating door ajar, overtemperature and timed conditions. A series of indicators are also provided to indicate, in the absence of a sensed condition being outside its predetermined range, that the system is sequentially scanning the sensors. These indicators are sequentially energized and de-energized at a rate different from and independent of the scanning of the sensors.

In the event of an overtemperature condition within the refrigerated airspace, the system delays an overtemperature indication until the condition has existed for a predetermined period of time. The system also has the capability of storing the existence of a previous overtemperature condition and detecting a subsequent return to normal operating temperatures, and provides a positive and distinct indication to the user of this sequence of events.

By indicating the existence of an overtemperature condition, or the previous existence of such a condition with a subsequent return to normal operating temperatures, the system alerts the user to the possibility of food spoilage, loss of food quality or the necessity for corrective maintenance. In order to de-energize an alarm or indicator raised in response to this or certain other sensed conditions, the system requires acknowledgement by the user, insuring that the user has been alerted to the abnormal condition.

The system utilizes a visual display, preferably in the form of a vacuum fluorescent device, which is located within the fresh food compartment door. In addition, a speaker is utilized to provide an audible signal in response to a command from the system.

The system also provides an indication when a power outage occurs which results in a resetting of the system.

The electronic sensing and display system includes a microcomputer, which allows the use of a minimum number of hardwired components, thereby reducing space requirements and providing for a relatively inexpensive system. Further, the sensing and display system is self-contained and is designed to be connected and function independently of the normal refrigerator control circuitry. The refrigerator control circuitry may, however, be modified to improve the ability to the sensing system to detect certain component failures within the refrigeration system.

Other features of the invention will be apparent from the following description and from the drawings. While an illustrative embodiment of the invention is shown in the drawings and will be described in detail herein, the invention is susceptible of embodiment in many forms and it should be understood that the present disclosure is to be considered as an exemplification of the principles of the invention and it is not intended to limit the invention to the embodiment illustrated.

DESCRIPTION OF THE PREFERRED EMBODIMENT

Figure 1:
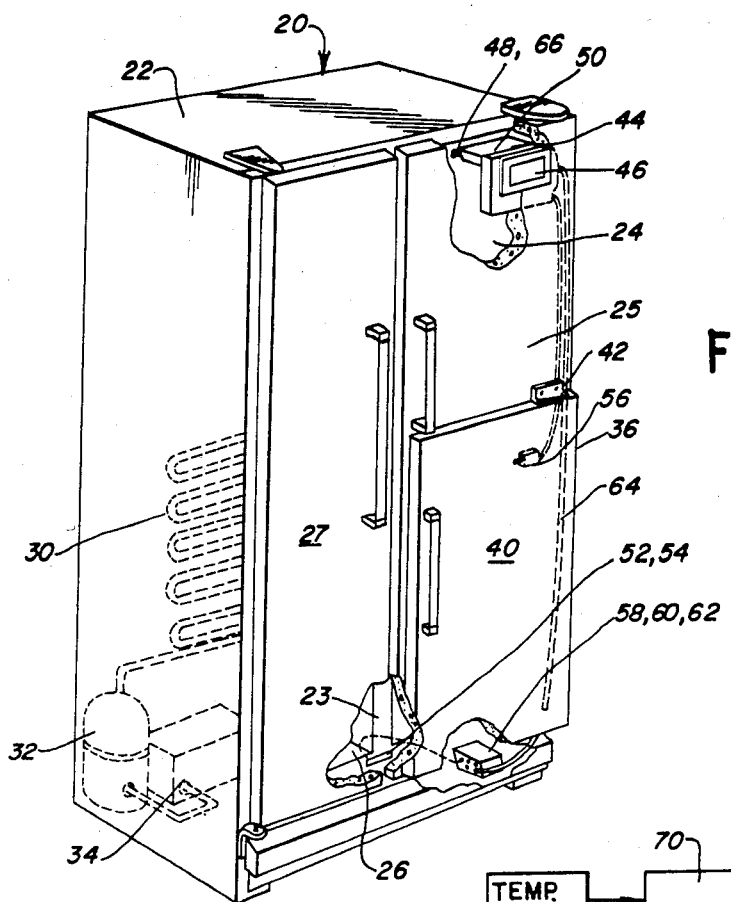
FIG. 1 is a perspective view of a refrigerator having portions of the doors broken away to reveal the electronic sensing and display system of the present invention.

Referring to FIG. 1, a conventional refrigerator 20 is illustrated in conjunction with the unique electronic sensing and display system. The refrigerator 20 includes a cabinet 22 having a divider wall 23 separating the space within the cabinet 22 into a fresh food compartment 24, which is enclosed by a fresh food door 25, and a freezer compartment 26, which is enclosed by a freezer door 27. The fresh food and freezer compartments 24, 26 are cooled by passing refrigerated air into the compartments through a discharge air duct and an outlet grille (not shown).

Air is refrigerated as a result of being passed in heat exchange relationship with an evaporator 30, which is interconnected through appropriate tubing to a conventional compressor 32, a condenser 34 and an accumulator or header (not shown), to effect the flow of refrigerant thereto. The refrigeration apparatus may be disposed within a compartment located below the fresh food and freezer compartments 24, 26.

Mounted on a lower portion 36 of the fresh food compartment door 25 is an access door 40 which allows a user to obtain access to a portion of the fresh food compartment 24, without the necessity of opening the entire fresh food door 25. The access door 40 is mounted over a cut-out in the door 25 by means of a pair of hinges 42.

Figure 2:
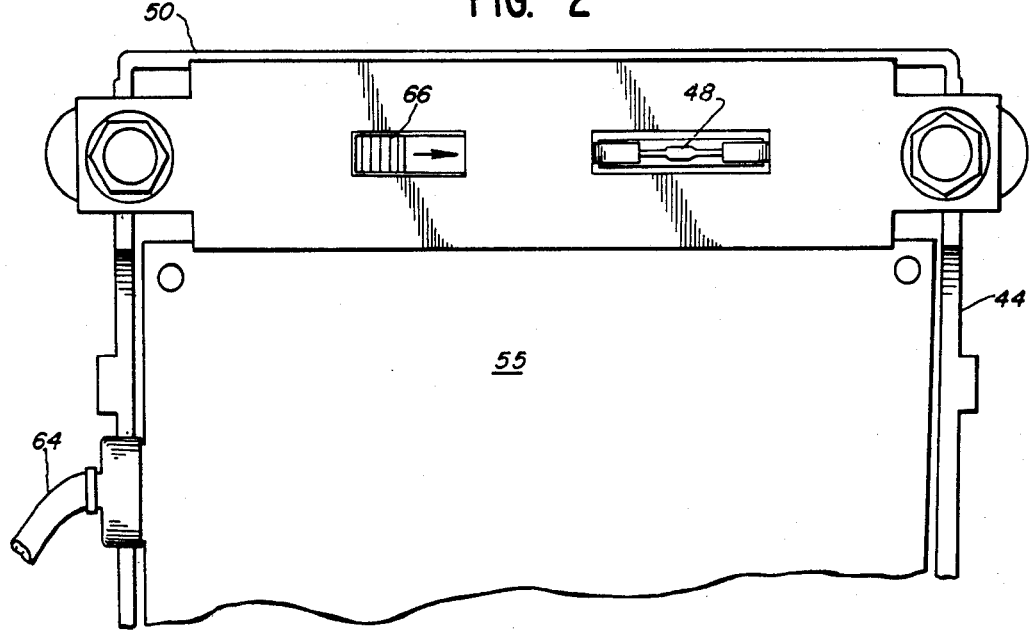
FIG. 2 is an elevational view of the rear of the display housing with its back cover removed to reveal the components therein.

Also mounted within the fresh food door 25 is a display housing 44, which in turn mounts a display 46 which may be of the vacuum fluorescent type. For a detailed description of the display housing 44 in the fresh food compartment door 25, reference should be made to the copending application of Stephen W. Paddock and Ralph Tate, Ser. No. 255,672, now U.S. Pat. No. 4,404,813; owed by the assignee of this application, and entitled "Door Mounted Refrigerator Control Structure". Briefly, the housing 44 is mounted in the upper right-hand corner of the fresh food door 25 and an inwardly projecting portion 50 of the housing 44 extends into the fresh food compartment 24. Referring also to FIG. 2, a thermistor 48 is mounted in the housing portion 50 within the fresh food compartment 24 so as to sense the temperature therein.

Disposed within the display housing 44 is a printed circuit board 55 on which is mounted the circuitry for the electronic sensing and display system of the present invention. The display housing 44 is mounted in the fresh food door 25 such that only the display 46 and a small frame portion of the housing 44 are visible from the outside of the refrigerator 20 when the door 25 is closed.

Connected to the circuitry within the display housing 44 are three door switches 52, 54 and 56, FIG. 1, which indicate the open/closed condition of the fresh food door 25, the freezer door 27 and the access door 40, respectively. The switches 52 and 54 may be of the magnetic reed type, or may be of any other suitable construction, and may be mounted as a single unit in the lower portion of the refrigerator 20 between the doors 25, 27. The switch 56 may be a plunger-type or rocker-arm switch mounted adjacent the access door 40 so as to be actuable in response to the opening or closing thereof.

Also coupled to the circuitry located within the display housing 44 is a transformer 58 which provides a proper operating voltage for the system components and a speaker 60 which provides an audible alarm in response to a signal generated by the system. The transformer 58 and the speaker 60 may be contained in a unitary housing 62 located below the compartments 24, 26, and may be coupled to the circuitry within the housing 44 by means of leads 64 which extend therebetween through the insulation space within door 25.

Located adjacent the thermistor 48, FIG. 2, is a two-position auto scan switch 66 which is coupled to the circuitry within the housing 44 and which interacts therewith in a manner to be hereinafter described.

Figure 3:
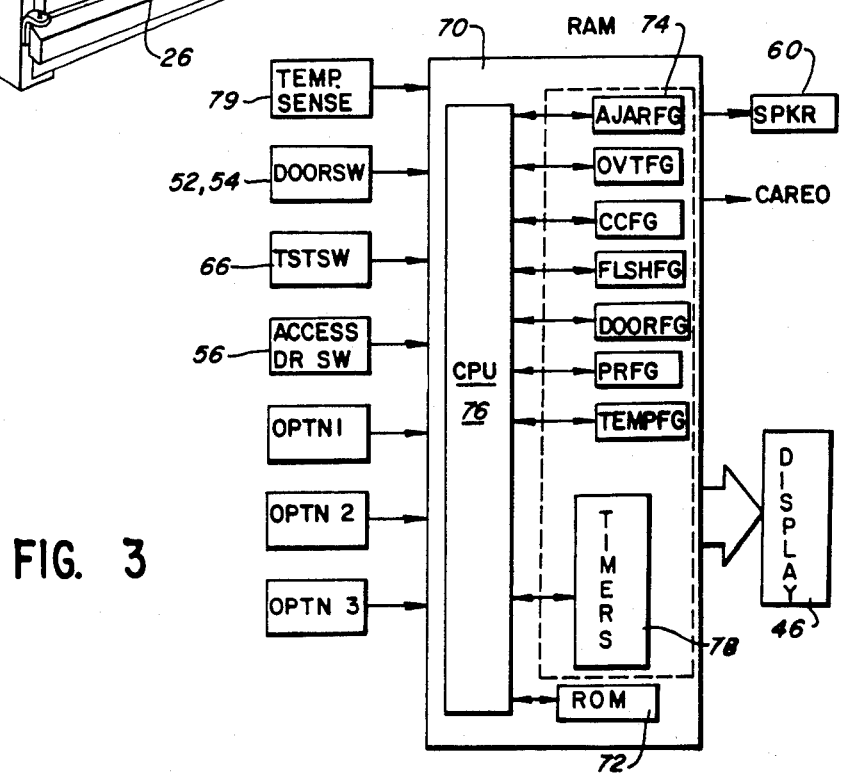
FIG. 3 is a block diagram of the electronic sensing and display system of the present invention.

Referring to FIG. 3, a block diagram of the electronic sensing and display system is illustrated. The system includes electronic signal processing means which may be implemented using discrete digital logic components or through the use of a microcomputer. In the preferred embodiment illustrated, a single chip microcomputer 70 is used to perform the signal processing used to implement the sensing and display functions. The microcomputer integrated circuit 70 may be a conventional, single chip device and may include on the chip a 1024×8-bit program read-only-memory, or ROM 72, and a 64×4-bit scratch pad random access memory, or RAM 74. The microcomputer 70 also contains a central processing unit, or CPU 76, which performs the various computations used in the sensing and display processes. The ROM 72 contains the control program, the control logic, and the constants used during control execution. The RAM 74 contains registers which store the several variables and flags used in the control program. Also included in the RAM 74 are a series of timer registers 78. While for purposes of clarity the RAM 74 has been illustrated as containing separate storage registers for each variable or flag, it is to be understood that each storage register may contain the value of several variables or flags over the course of a program execution.

In the illustrated embodiment, microcomputer 70 is implemented by using a National Semiconductor COP420L integrated circit which has, in addition to the ROM 72, the RAM 74 and the CPU 76, a serial I/O register (not shown) which is connected so as to function as a seconds counter, as will be described later.

The inputs to the microcomputer 70 include the fresh food and freezer door switches 52 and 54, the access door switch 56, the auto scan switch 66, and a series of option inputs, labeled OPTN1, OPTN2 and OPTN3, which are used to select various operating options which are built into the control program. The use of these options in the control program will be more fully described hereinafter.

Another input to the microcomputer 70 is from a temperature sensing circuit 79 which utilizes the signal developed by the thermistor 48 to provide a digital signal indicating whether the temperature of the fresh food compartment 24 is above or below a predetermined set-point temperature.

Outputs from the microcomputer 70 are coupled to selectively energize the vacuum fluorescent display 46 and the speaker 60. In addition, the microcomputer 70 generates an output waveform, designated CAREO, which is utilized in a manner to be hereinafter described.

The electronic sensing and display system senses a number of operating conditions of the refrigerator and provides an indication, via the vacuum fluorescent display 46 and the speaker 60, of the status of these conditions. The sensed conditions include the temperature of the fresh food compartment 24, a "door-open" condition of any of the doors 25, 27 or 40, the occurrence of a power interruption and the accumulation of a predetermined time interval.

Figure 4:
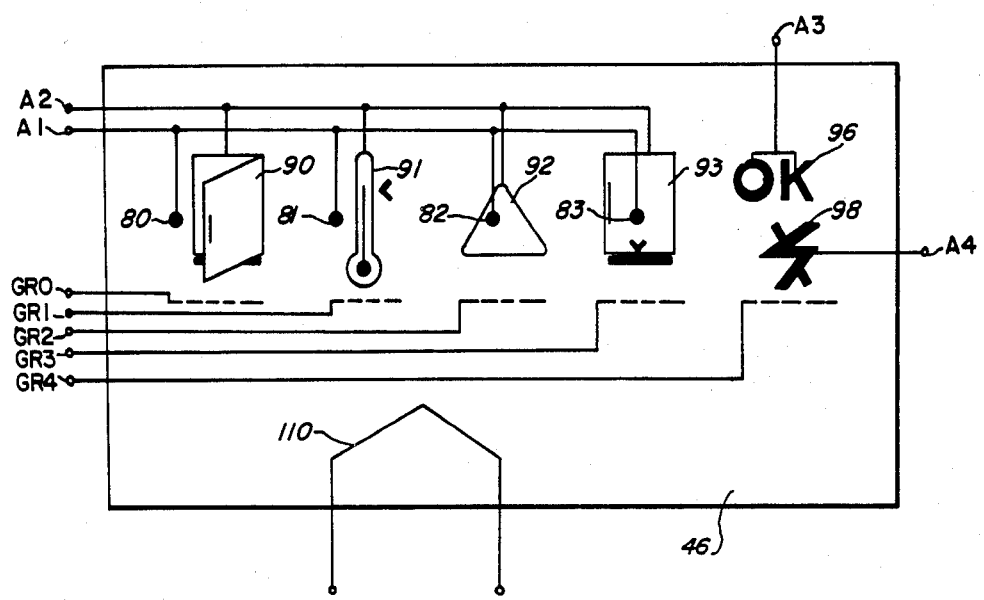
FIG. 4 is a schematic diagram of the display shown in block diagram form in FIG. 3.

Referring also to FIG. 4, the general system operation will be described in conjunction with the display 46 illustrated therein. Although for purposes of clarity, each of the display symbols are illustrated as being concurrently illuminated, in normal operation only a portion of the symbols are usually energized at any particular time, as will become evident in later portions of this specification.

The display includes a first series of electrical indicators comprising a series of dots, referred to an enunciators 80-83, associated with and adjacent a second series of electrical indicators comprising a series of pictorial symbols 90-93, respectively. These pictorial symbols are referred to as a door ajar symbol 90, an overtemperature symbol 91, an alert symbol 92 and a check condenser symbol 93. Other symbols not having associated enunciators are an "OK" symbol 96 and a power outage symbol 98.

The display is illuminated in one or more of several modes depending upon the status of the respective sensed conditions. These modes are referred to as: a NORMAL mode, a DOOR OPEN mode, a WARM mode, an ALERT mode, a POWER INTERRUPTION mode, a CHECK COIL mode, and a TEST mode.

NORMAL MODE

In the NORMAL mode, the enunciators 80-83 are sequentially energized from left to right for an interval of one second each, and the "OK" indicator 96 is continuously energized. In other words, enunciator 80 is first energized for one second while the enunciators 81-83 are de-energized, then the enunciator 81 is energized while the enunciators 80, 82 and 83 are de-energized, and so on. The NORMAL mode is operative only when each of the sensed conditions is within its normal operating range. The normal operating ranges for each of the sensed conditions are listed below.

| SENSED CONDITION | NORMAL OPERATING RANGE |
| --- | --- |
| Fresh food, freezer and access doors | CLOSED |
| Fresh food compartment temperature | LESS THAN 60° F., OR GREATER THAN 60° F. BUT THE DURATION OF THIS OVERTEMPERATURE CONDITION HAS EXISTED FOR LESS THAN 90 MINS. OR 122 MINS. DEPENDING UPON STATUS OF OPTN3 INPUT |
| Accumulated Time since refrigerator was energized or system was reset | LESS THAN ONE OR TWO MONTHS, DEPENDING UPON STATUS OF OPTN2 INPUT |
| Power | UNINTERRUPTED |

In other words, the NORMAL mode is activated only when: (1) the fresh food door 25, the freezer door 27 and the access door 40 are all closed; and (2) the fresh food compartment temperature is less than 60° F., or greater than 60° F. but the duration of this overtemperature condition has existed for less than a predetermined length of time depending upon the signal provided by the OPTN3 input; and (3) the total accumulated time (i.e. the length of time the refrigerator has been energized or the length of time since the system was reset) is less than a predetermined length of time depending upon the signal provided by the OPTN2 input, and (4) the power supply to the refrigerator has not been interrupted.

It should be noted that the particular upper limit for the normal operating range of the fresh food compartment 24 temperature may be varied if desired. Moreover, the duration of an initial period of an overtemperature condition during which the NORMAL mode remains activated, may also be changed, if desired.

DOOR OPEN MODE

When any or all of the doors 25, 27 or 40 are opened, the NORMAL mode is terminated and the DOOR OPEN mode is actuated. At this time, the "OK" symbol 96 and the enunciators 80–83 are de-energized, and the door ajar symbol 90 is energized. If the opened door remains ajar for three consecutive minutes, an audible sequence is initiated which provides an indication to the user that a door ajar condition has existed for longer than a predetermined duration.

The audible sequence is a series of eight one-second beeps which are emitted from the speaker 60. The series of beeps is then followed by two minutes of silence, after which the sequence begins again.

When the doors 25, 27 and 40 are all closed, the DOOR OPEN mode is de-actuated, and the NORMAL mode is resumed, at which time the audible sequence is stopped.

WARM MODE

Figure 5:
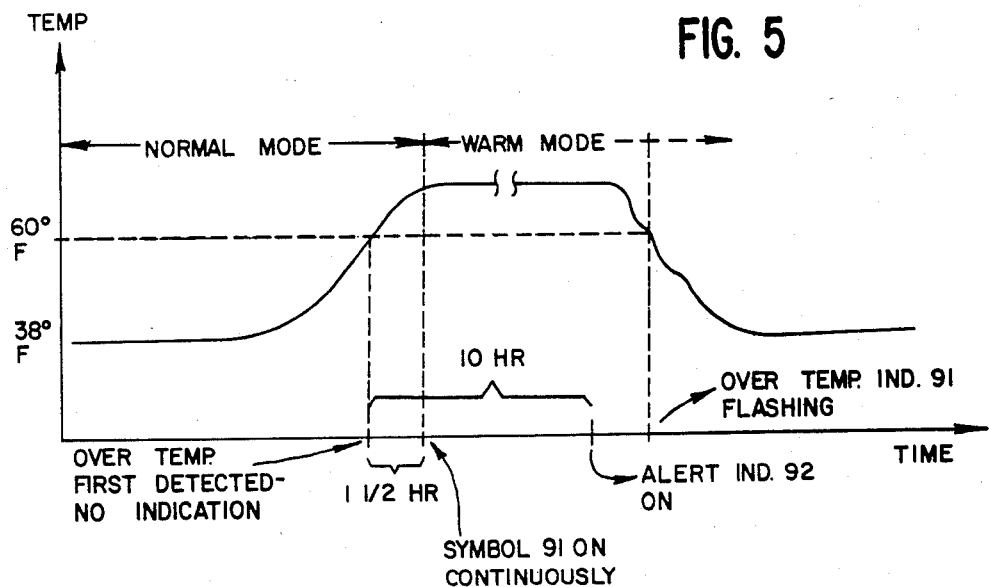
FIG. 5 is a graph illustrating the operation of the overtemperature indication operation.

As previously mentioned, the temperature sensing circuit 79 receives the signal developed by the thermistor 48 and generates a digital output signal which indicates whether the fresh food compartment 24 temperature is above or below the set point temperature of 60° F. As is shown more particularly in FIG. 5, if this temperature is exceeded for a continuous period of, for example, 1.5 hours, the microcomputer 70 switches from the NORMAL mode to the WARM mode. At this time, the enunciators 80–83 and the "OK" symbol are de-energized, and the overtemperature symbol 91 is continuously illuminated. Furthermore, when the symbol 91 is energized, the audible sequence is started. The overtemperature symbol 91 will be continuously energized, and the audible sequence will continue until the fresh food compartment 24 temperature falls below 60° F. At this time, the audible sequence will be stopped and the overtemperature signal 91 will flash at one-second intervals to indicate to the user that a previous overtemperature condition has existed, but has since disappeared. Under this condition, the flashing overtemperature symbol 91 can be extinguished, and the NORMAL mode resumed, by moving the two-position auto scan switch 66 from a first position shown in FIG. 2, referred to as a normal position, to a second position, referred to as a reset position, and back again.

The delay period selected by the OPTN3 input before which the WARM mode is initiated is inhibited when the refrigerator 20 is first energized. In this case, the overtemperature symbol 91 and the audible sequence are both actuated immediately upon energization of the refrigerator 20. Once the refrigerator has "pulled down", i.e. achieved operating temperatures, the overtemperature signal 91 will flash and the audible sequence will be stopped.

ALERT MODE

The ALERT mode can only occur in conjunction with a DOOR OPEN mode or a WARM mode. If either or both the DOOR OPEN mode or the WARM mode exists continuously for 10 hours, the alert symbol 92 is energized to warn the user that an abnormal condition has existed for a relatively long period of time. Of course, at this time, the NORMAL mode is inactive, and the enunciators 80–83 and the "OK" symbol 96 are de-energized.

The ALERT mode is disabled when the DOOR OPEN mode and/or the WARM mode are terminated. The alert symbol 92 is also de-energized any time the overtemperature symbol 91 begins flashing.

POWER INTERRUPTION MODE

Whenever a power interruption occurs which causes a resetting of the system, the power outage symbol 98 flashes at one-second intervals. The flashing power outage symbol 98 does not affect any of the other system modes. To stop the flashing symbol 98, the auto scan switch 66 is moved from the normal position to the reply position and back again.

CHECK COIL MODE

The CHECK COIL mode is actuated, and the NORMAL mode is de-actuated, after a predetermined time period has elapsed from initial energization of the refrigerator 20. This time period may be one month or two months, depending upon the status of the OPTN2 input.

Once the CHECK COIL mode is actuated, the check condenser symbol 93 is continuously energized and continues in this state until the auto scan switch 66 is moved from the normal position to the reply position and back again. At this time, a check coil timer register, called CCOND, located in the microcomputer 70 is reset to either one month or two months, depending upon the status of the OPTN2 input.

The illumination of the check condenser symbol 93 indicates to the user that the coils of the condenser 34 should be inspected and, if necessary, cleaned to maintain the operating efficiency of refrigerator 20.

The check condenser symbol 93 also will be turned on immediately after a power interruption provided that a warm condition is not sensed by the temperature sensing circuit 79. If however, the temperature sensing circuit 79 senses a warm condition immediately following a power outage, the check coil timer is reset by the microcomputer 70 to either one month or two months, so that only a power interruption indication will be provided under these conditions.

The CHECK COIL mode may be used to sense and indicate the status of a different timed condition simply by replacing the check condenser symbol 93 with an appropriate symbol. For example, if it is desired to suggest to the user that sufficient time has elapsed that the ice stored in the refrigerator may have become stable, it is only necessary to replace the symbol 93 with a symbol representing an ice cube and to store in the CCOND register a value corresponding to the desired length of time after which the ice may become undesirably old. In this manner the user can reset the CHECK COIL timer, via auto scan switch 66, when ice is initially stored in the refrigerator 20, and an indication will be generated after the timed period, indicating that the ice should be checked.

TEST MODE

The TEST mode is used to check the operating condition of the electronic sensing and display system. It also allows the operation of the display to be demonstrated, such as by a salesperson or the like. This mode is initiated by moving the auto scan switch 66 to the reset position. When this occurs, a two second delay is initiated, after which all of the symbols 90-93 and the enunciators 80-83 are energized and the audible sequence is started. After eight seconds, the audible sequence is stopped.

From this point, the display repeats the following sequence as long as the auto scan switch 66 is in the reply position:

(a) the "OK" symbol 96 is energized and the enunciators 80-83 are sequentially energized, for 15 seconds, then (b) the "OK" symbol 96 and the enunciators 80-83 are de-energized for the next 30 seconds and only the four symbols 90-93 are energized.

This sequence continues to repeat until the switch 66 is moved back to the normal position. Furthermore, during this sequence the speaker 60 beeps each time one of the doors 25, 27 or 40 is opened or closed if the remaining doors are closed. If more than one door is open, the speaker will not beep when another door is open or closed.

The normal sensing and indicating functions are resumed when the switch 66 is moved back to the normal position.

MULTIPLE MODES

Two or more of the DOOR OPEN, WARM, ALERT, POWER INTERRUPTION and CHECK COIL modes can be actuated at the same time. Moreover, if the system has initiated the audible sequence in one of these modes, and a second one of these modes is actuated, the second mode does not alter the audible sequence, although the indicator for the second mode is energized.

Figure 6A:
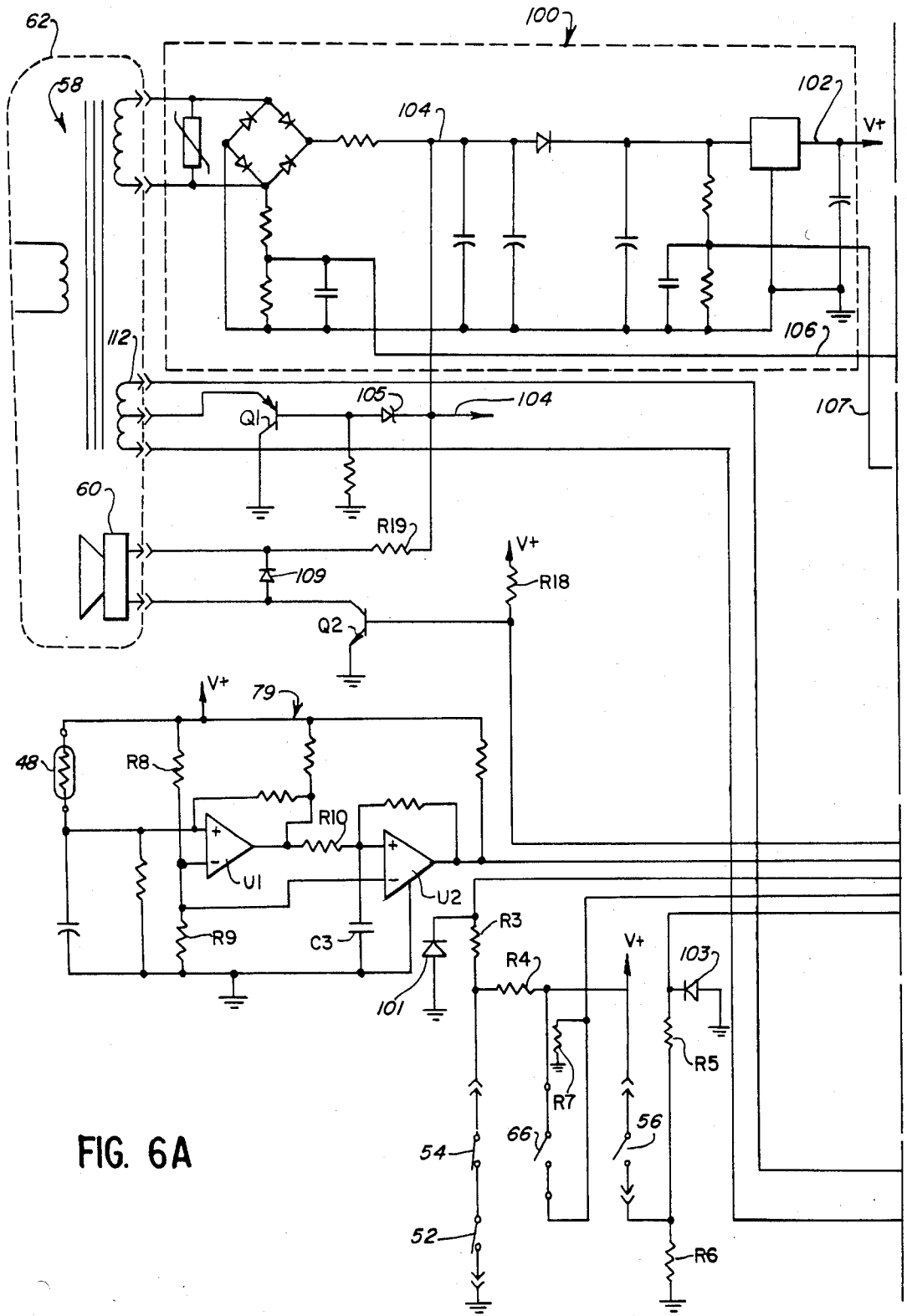
FIGS. 6A and 6B comprise a single schematic diagram, when joined along the dashed lines, of the system shown in block diagram form in FIG. 3.
Figure 6B:
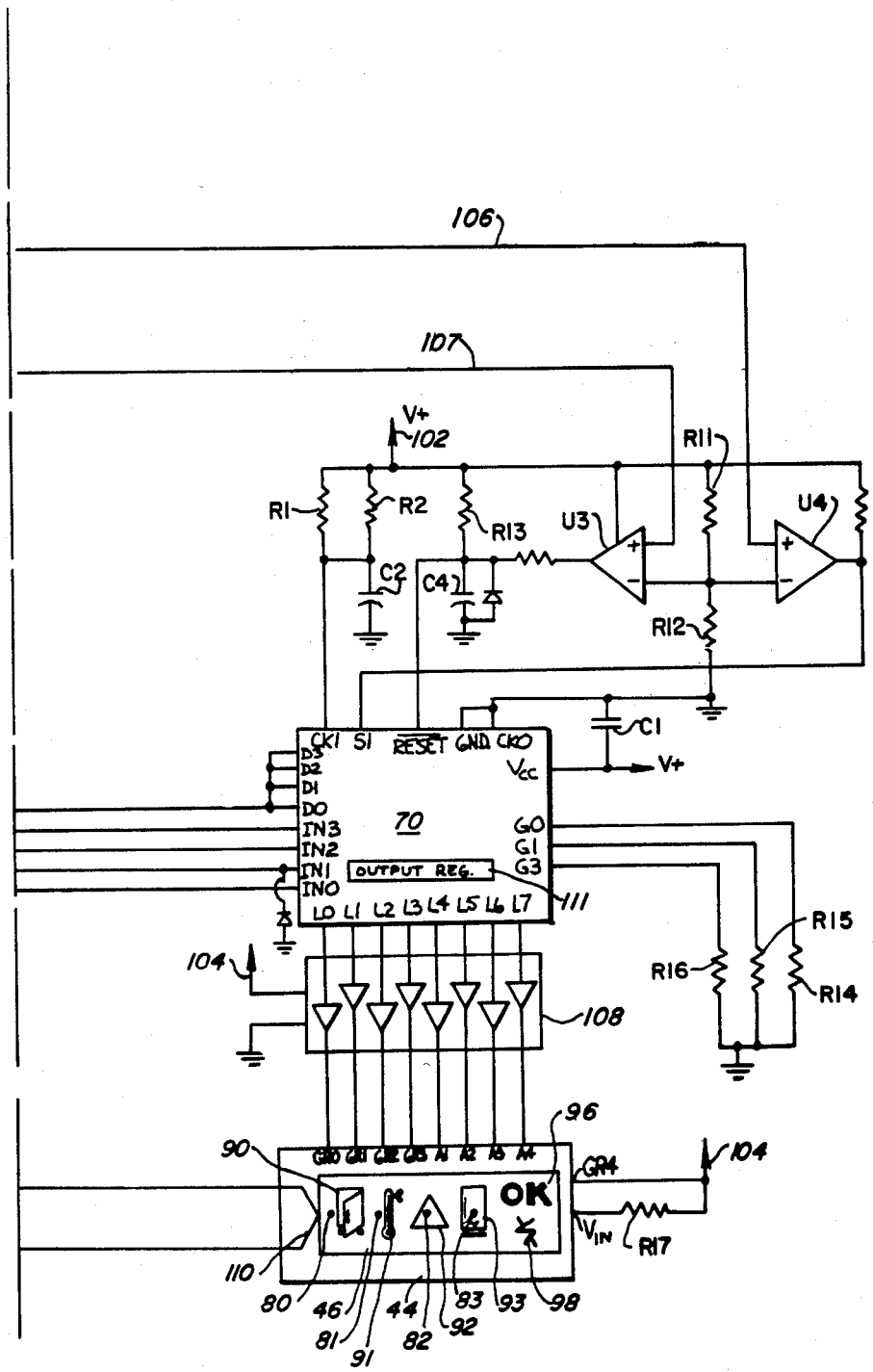

Referring also to FIGS. 6A and 6B, the circuit of the electronic sensing and display system, shown in block form in FIG. 3, is illustrated in detail. Power for the various system components is provided by the transformer 58, FIG. 6A, the output of which is coupled to the input of a rectifying and regulating circuit 100. A regulated DC output V+ is provided on a line 102 to a power supply input line $V_{CC}$ of the microcomputer 70, FIG. 6B. The voltage V+ on the line 102 may be a 5-volt regulated DC output from the circuit 100. Another power supply input GND of microcomputer 70 is connected to ground potential, and a capacitor C1 is from the $V_{CC}$ terminal to this ground potential.

A clock input CK1 is supplied with DC from the line 102 through a parallel combination of resistors R1 and R2, and connected to ground potential through a capacitor C2. The resistors R1 and R2, the capacitor C2 and comparator U4 form the clock pulse circuitry for the internal clock of the microcomputer 70.

The open/closed condition of the doors 25, 27 and 40, is supplied to the microcomputer 70 over a pair of input lines IN0 and IN2. The fresh food door switch 52 and the freezer door switch 54, FIG. 6A, are connected in series between the input IN2 through a resistor R3 and ground potential. The input IN2 is also connected to ground potential through a diode 101 and through the resistor R3 and a resistor R4 to the regulated voltage V+ appearing on line 102.

The access door switch 56 is connected between supply potential V+ and the juncture of a pair of resistors R5 and R6, which are in turn connected between the input IN0 and ground. A diode 103 is also coupled between the input IN0 and ground.

The input IN2 receives a high state signal when either or both the fresh food switch 52 and the freezer door switch 54 are open, indicating that one of the doors 25 or 27 are open. Conversely, input IN0 receives a low state signal when access door switch 56 is open, indicating that the access door 40 is closed. The respective signals presented to the IN0 and IN2 inputs are the result of the fresh food and freezer door switches 52 and 54 being normally closed switches while the access door switch 56 is a normally open switch.

An input IN1 receives the information regarding the position of the auto scan switch 66. The switch 66 is open when in the normal position and is coupled directly between supply potential V+ on line 102 and the input IN1. A resistor R7 is coupled between the input IN1 and ground. When the switch 66 is in the normal position, a low state signal is coupled to the input IN1. Conversely, when the switch 66 is moved to the reset position, a high state signal is coupled to the input IN1 to switch the system into the TEST mode.

Information regarding the temperature within the fresh food compartment 24 is supplied to an input IN3 which receives a signal from the temperature sensing circuit 79, FIG. 6A. For a detailed description of the operation of the temperature sensing circuitry 79, reference should be made to the pending application of Stephen Paddock and Andrew Tershak, Ser. No. 68,473, now U.S. Pat. No. 4,297,851, filed Aug. 20, 1979, owned by the assignee of this application, and entitled "Temperature Sensing Circuit With High Noise Immunity". Briefly, when the temperature sensed by the thermistor 48 rises above the set point, such as 60° F. as determined by a voltage divider network consisting of resistors R8 and R9, the output of a comparator U1 will change to a high state, indicating an overtemperature condition within the fresh food compartment 24. This high state signal is sent to the input of a comparator U2 through an RC circuit consisting of a resistor R10 and a capacitor C3, which causes the output of U2 to also assume a high state.

Conversely, when the temperature sensed by the thermistor 48 is below the set point, the output of the comparator U1 assumes a low state, which is coupled to the input of U2 through the RC network consisting of the resistor R10 and the capacitor C3. The low state input causes the output of the comparator U2 to also assume a low state. The signal developed at the output of U2 is coupled directly to the IN3 input of the microcomputer 70.

The microcomputer 70 is reset in the event of a power outage by means of a signal provided to a $\overline{RESET}$ input. A comparator U3, FIG. 6B, receives at its noninverting input an unregulated voltage provided by the rectifying and regulating circuit 100 over a line 107. When the voltage appearing on the line 107 drops below the voltage developed by a voltage divider consisting of resistors R11 and R12 connected between line 102 and ground, the output of comparator U3 changes state and a low state signal is coupled to the $\overline{RESET}$ input. A combination of resistor R13 and capacitor C4 hold the microcomputer 70 in the reset mode for a short period of time when power is first applied in order to allow the power supply to stabilize before the microcomputer 70 is energized.

The seconds and minute timer functions for the microcomputer 70 are implemented by supplying a 60 hz. square wave to an input S1. A line 106 receives a 60 hz. signal from the rectifying and regulating circuit 100, and is coupled to the noninverting input of a comparator U4. The inverting input of the comparator U4 receives the voltage developed at the junction of the resistors R11 and R12. The signal levels at the inverting and noninverting inputs of the comparator U4 are adjusted such that a 60 hz. square wave is developed at the output thereof, which is coupled directly to the S1 input of the microcomputer 70.

The inputs OPTN1, OPTN2 and OPTN3 are coupled to the microcomputer 70 at a series of data inputs G0, G1 and G3, respectively. The input OPTN1 is used to initialize the check condenser timer CCOND, located in the timer register 78, to either zero or two months after a power interruption, depending upon the state of the signal coupled thereto. Similarly, OPTN2 is used to set the CCOND timer to either one month or two months before which a check coil indication is generated, and OPTN 3 is used to select for a timer register, denoted OVTDL which is located in the timer register 78, the length of time before which an overtemperature condition within the refrigerator 20 is indicated by the display. This delay period may be initialized at 1½ hours as previously noted, or may be set equal to 122 minutes, depending upon the state of the signal coupled to the input G3.

The inputs G0, G1 and G3 contain internal pullup circuitry so that a particular option is selected if no connection is made to a particular input. If, however, resistors are connected between the inputs and ground, such as the resistors R14, R15 and R16, each of the inputs will be low, and different options will be selected. A list of the input states, and the options selected by the input states, is set out below.

| INPUT | OPTION |
|---|---|
| G0 LOW | CCOND = 0 after power interruption |
| G0 HIGH | CCOND = 2 months after power interruption |
| G1 LOW | CCOND = 2 months |
| G1 HIGH | CCOND = 1 month |
| G3 LOW | OVTDL = 90 minutes |
| G3 HIGH | OVTDL = 122 minutes |

The microcomputer 70 further includes a series of display outputs L0-L7, which are used to drive the display elements. The outputs L0-L7 are coupled to a driver/buffer circuit 108 which amplifies the signals appearing at the outputs L0-L7 and couples them to the display 46. In the preferred embodiment illustrated, the driver/buffer circuit is a Darlington driver integrated circuit, manufactured by Spraque Products Co. under Part No. UDN 6118 A-3, which receives as a power input an unregulated voltage generated by the circuit 100 appearing on a line 104, FIG. 6A.

The amplified signals from the driver/buffer 108, FIG. 6B, are coupled to various inputs of the display 46. In the preferred embodiment illustrated, the display 46 may be of the vacuum fluorescent type, such as those manufactured by Futaba Corp. of America.

The amplified output signals from the outputs L0–L3 are coupled to a series of grid inputs GR0–GR3, respectively. As shown in FIG. 4, the grid inputs GR0–GR3 serve as connections to the grids for the door ajar symbol 90, the overtemperature symbol 91, the alert symbol 92 and the check condenser symbol 93, respectively. A separate grid input GR4, which serves as the grid connection for the OK symbol 96 and the power outage symbol 98, is coupled to the unregulated voltage appearing on line 104.

The amplified output signals from the outputs L4L7 of the microcomputer 70 are coupled to a series of anode inputs A1–A4, which serve as connections to the anodes for the enunciators 80–83, the symbols 90–93, the OK symbol 96 and power outage symbol 98, respectively.

An internal filament 110 of the display 46 is coupled across a transformer secondary winding 112, FIG. 6A, which is a part of the transformer 58. The secondary winding 112 develops a three volt AC signal which is biased by a transistor Q1 and a zener diode 105 to 13.5 volts DC below the level of the unregulated voltage appearing on the line 104. The display 46 is also coupled at a power supply input $V_{IN}$ to the unregulated voltage line 104 through a resistor R17.

The voltages supplied to the inputs $V_{IN}$, GR0–GR4, A1–A4 and to the filament 110 are such as to cause lighting of the display elements 80–83, 90–93, 96 and 98, in response to signals developed at the outputs L0–L7 of the microcomputer 70.

It should be noted that the various symbols and enunciators of the display 46 are energized and de-energized by impressing properly referenced operating voltages on the inputs GR0–GR3 and A1–A4 of the display 46. Each of the outputs L0–L7 is coupled to a separate stage of an 8-bit output register 111 located within the microcomputer 70. The contents of the register 111 comprise an 8-bit word which contains the proper sequence of zeroes and ones to energize the appropriate symbols or enunciators, as determined by the control program. For example, if it is desired to energize the door ajar symbol 90 alone, then the output word from the microcomputer 70 contains proper signals at the L0 and L5 outputs so as to energize the symbol 90, and proper logic levels at the remaining outputs to deenergize the OK symbol 96 and the enunciators 80–83. The selection of proper logic levels and particular operating voltages for the input of the display 46 are conventional and will not be described here.

The signals for generating an audible output from the speaker 60, FIG. 6A, are provided at a series of outputs D0–D3, FIG. 6B, of the microcomputer 70. These outputs are connected together and to the base of a transistor Q2, see FIG. 6A, which is biased by a resistor R18 coupled between the base thereof and the regulated voltage V+. The collector of the transistor Q2 is connected to an input of the speaker 60, while the other input thereof is connected through a resistor R19 to the unregulated voltage appearing on line 104. A diode 109 is coupled between the inputs of the speaker so as to dissipate any induced emf developed by the internal coil of the speaker.

The outputs D0–D3 energize the speaker 60 by means of a 2500 hz. signal which is toggled on and off at 0.20 millisecond intervals for a period of 80 milliseconds. The speaker energization is controlled by the audible sequence, already described, which is built into the control program.

Figure 7:
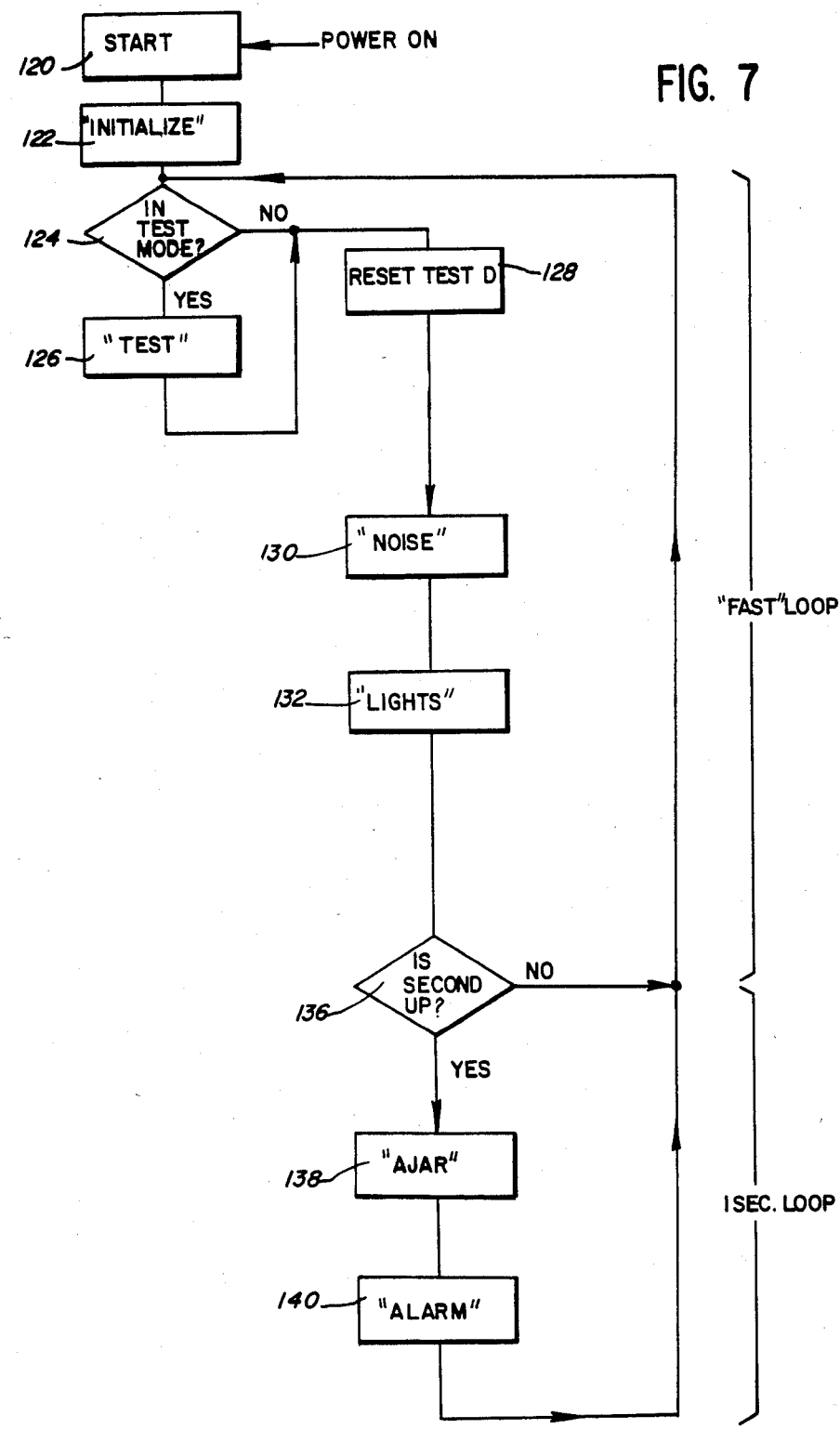
FIG. 7 is a flow chart of the main control program of the present invention.

Referring now to FIG. 7, there is illustrated a block diagram of the main control program of the present invention. The control program includes a procedure whereby "dummy" RAM constants are set up to surround important timers and registers. The dummy RAM constants are frequently checked to determine whether the values have been changed by noise in the system. If a change is detected, then other timers and registers may have been affected, and consequently, the registers and timers are reinitialized so as to prevent an erroneous indication from becoming apparent to the user.

Moreover, various sytem parameters are redundantly set so as to insure that the system is maintained in an error-free state. This feature is particularly useful in noisy environments caused by the switching of various components, such as the compressor and door switches of the refrigerator 20.

Program initiation is performed by a block 120 by energizing the microcomputer 70. The control program then proceeds through a series of subroutines which perform the various sensing and display functions.

The first subroutine, performed by a block 122 and referred to as "initialize", assigns values to the various timers, flags and registers used during the control process. A block 124 then determines whether the auto scan switch 66 is in the normal or the reset position. If the switch 66 is in the reset position, then a "test" subroutine is performed by a block 126. The test subroutine causes the system to go into the TEST mode whereby the various indicators are strobed and the audible sequence is initiated.

If it is determined by the clock 124 that the auto scan swtich 66 is in the normal position, then a block 128 reinitializes a particular register, referred to as TEST D, which is used in the test subroutine. This register is described in connection with the test subroutine in a later portion of the specification.

A pair of blocks 130 and 132 sequentially perform two subroutines, called "noise" and "lights". The lights subroutine reads the state of the switches 50, 54, 56 and 66, redundantly strobes the output of the microcomputer 70, refreshes timers and sets or resets various flags. The noise subroutine checks for electrical noise effects, and causes reinitialization of the various registers and timers if noise has affected the system.

Each of the blocks 124–132 are located in a "fast" loop which is executed at a relatively fast rate, such as once every 66.7 milliseconds. During this "fast" loop, each of the sensed conditions within the refrigerator are checked and various flags are set or reset. In this manner, an abnormal condition is detected relatively quickly, and any error introduced by noise in the system is quickly corrected.

A decision block 136 checks the condition of the seconds timer, and if one second has not elapsed since the timer was reset, control passes to the decision block 124 to continue the "fast" loop.

If the decision block 136 determines that one second has elapsed since the seconds timer has been reset, then a block 138 performs a subroutine, called "ajar" which, along with other functions, measures the length of time of a "door-open" interval.

Following the ajar subroutine is a block 140 which performs an "alarm" subroutine, which is used to perform the audible sequence and to strobe the enunciators 80-83.

Once the alarm subroutine is completed, control returns to block 124 which initiates a new series of "fast" loops.

Figure 8:
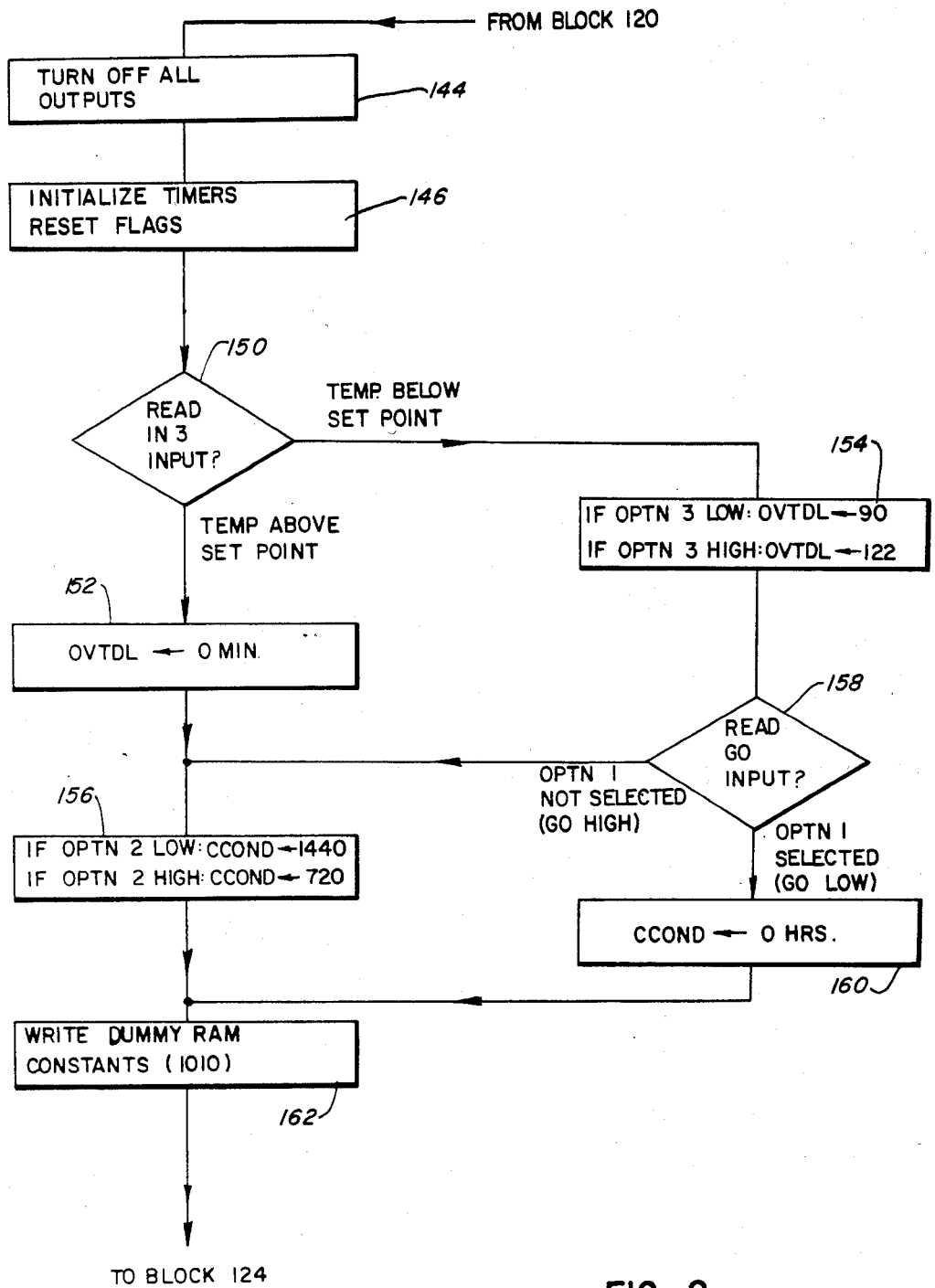
FIG. 8 is a flow chart of a portion of the main control program performed by the block 122 of FIG. 7.

Referring now to FIG. 8, there is illustrated the initialize subroutine performed by the block 122 of the main program. The subroutine is entered at a block 144 which de-energizes all microcomputer outputs to prevent any false indications which may arise following a power interruption or an initial energization of the system. A block 146 then initializes the timers and flags used in the control program. A list of these timers and flags, including a description of each, is set out below.

| TIMER/ FLAG | INITIAL- IZED VALUE | DESCRIPTION |
| --- | --- | --- |
| TEST A | 8 seconds | TEST mode count-down timer |
| TEST B | 15 seconds | TEST mode demonstration timer |
| TEST C | 30 seconds | TEST mode demonstration timer |
| TEST D | 2 seconds | TEST mode initiate delay |
| BEEPL | 8 repetitions | No. of consecutive beeps in an audible sequence |
| BEEPO | 120 seconds | Delay between audible sequences |
| AJART | 180 seconds | Door ajar alarm seconds timer |
| HR | 60 minutes | Hour timer |
| MIN | 50 seconds | Minute timer |
| CAUTM | 600 minutes | ALERT mode delay timer |
| CCFG | RESET | Check condenser indicator flag |
| AJARFG | RESET | Door ajar alarm flag |
| DOORFG | RESET | Door-open indicator flag |
| TEMPFG | RESET | Temporary storage flag |
| OVTFG | RESET | Overtemperature alarm flag |
| FLSHFG | RESET | Flashing overtemperature indicator flag |
| PRFG | RESET | Power interrupt indicator flag |

Each of the registers used to store the timer values are located in the timer registers 78. The values assigned to the OVTDL and CCOND timers are not assigned by the block 146, but are assigned in a later portion of the initialize subroutine.

A block 150 then checks the temperature of the fresh food compartment 24 by analyzing the status of the output of the temperature sensing circuit 79 as coupled to the IN3 input of the microcomputer 70. The block 150 provides a "debounce" function for the switching of the temperature sensing circuit 79 by taking several readings of the IN3 input, and when several successive readings are the same, passes control to either of a pair of blocks 152 or 154, depending upon whether the airspace temperature is above or below the set point of 60° F. If the temperature is above the set point, then the overtemperature delay timer OVTDL is set to zero by the block 152. The timer CCOND is then initialized to 720 hours to 1440 hours by a block 156, depending upon the status of the G1 input as determined by the option input OPTN2.

If it is determined by the block 150 that the temperature is below the set point, then the block 154 sets the overtemperature delay timer OVTDL to 90 or 122 minutes depending upon the signal coupled to the G3 input, as determined by the option OPTN3.

A block 158 determines the status of the input G0, and if the input G0 is low, indicating that the option OPTN1 is selected, a block 160 sets the check condenser timer CCOND to zero. If the signal coupled to the G0 input is high, i.e. OPTN1 is not selected, control passes to the block 156, which resets the value of CCOND.

A block 162 then writes a series of "dummy" constants in various registers in the RAM 74, which are later checked by the noise subroutine performed by the block 132. In the preferred embodiment, these registers are loaded with an alternating series of ones and zeroes in the four bits of each word in the RAM registers, and are later checked to determine whether the contents of these registers have changed.

Control from the block 162 then passes directly to the block 124 in the main program.

Figure 9:
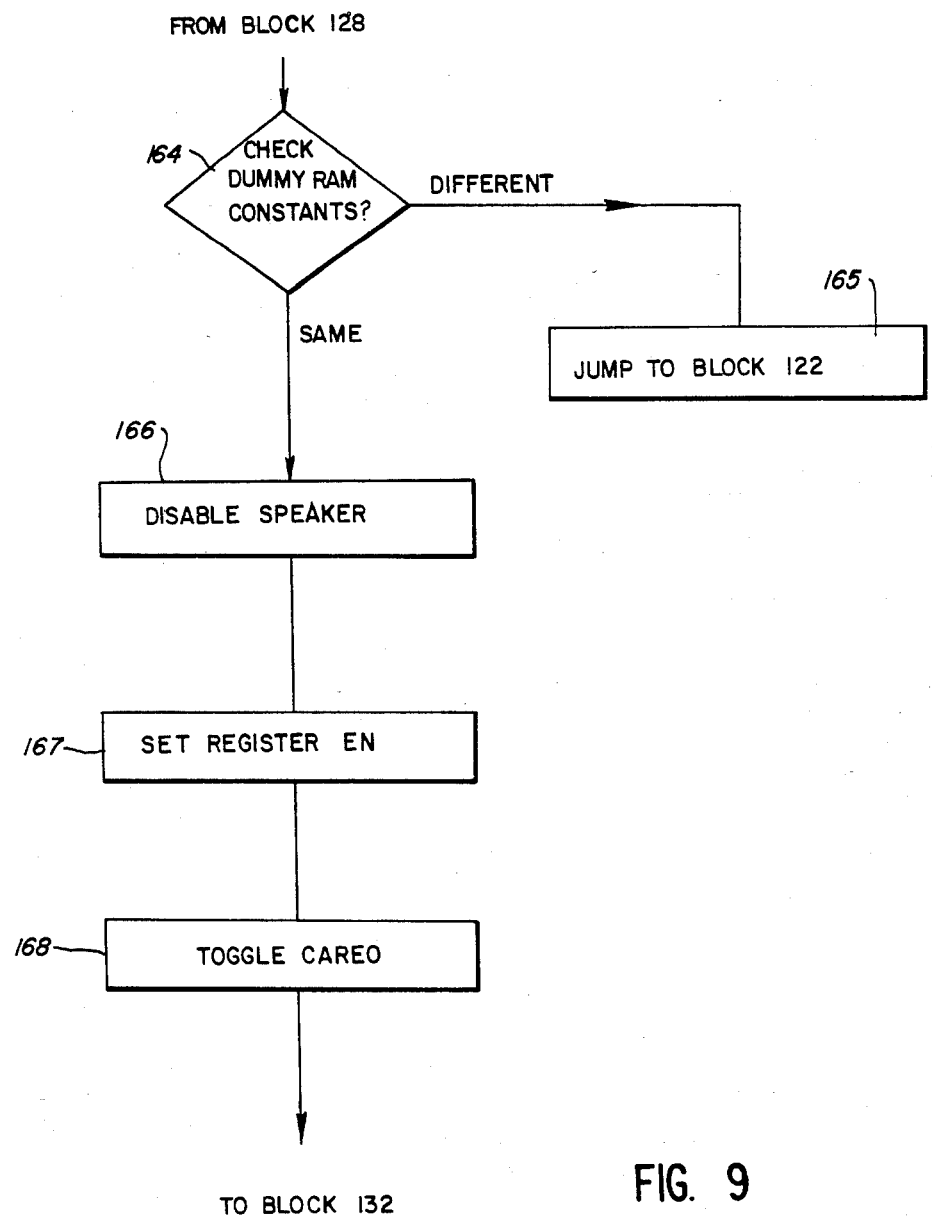
FIG. 9 is a flow chart of a portion of the main control program performed by the block 130 of FIG. 7.

Referring now to FIG. 9, the noise subroutine is illustrated in detail. The noise subroutine begins with a block 164 which tests the various RAM registers to determine whether the dummy constants stored therein have changed. This is performed by comparing the value stored in each of the registers against the original value stored therein in the initialization subroutine. As previously mentioned, this value is the same for each register and, in the illustrated embodiment, is equal to the decimal number ten. If any of the RAM registers into which a dummy constant was written contains a number other than ten, a block 165 transfers control back to the initialization subroutine so as to reset the timers and flags used during the course of a control program execution.

If the block 164 determines that the dummy RAM constants have not changed, then a block 166 ensures that the speaker driver transistor Q2 is disabled by de-energizing the outputs D0–D3. A block 167 then redundantly sets an internal register, called EN, of the microcomputer to ensure that the system is functioning in the proper operational mode. The output CAREO of the microprocessor is then toggled by a block 168 to produce a square-wave output which is sensed by an external caretaker circuit (not shown) which in turn resets the microprocessor if noise or a system failure causes the square-wave to terminate.

Control from the block 168 then passes to the block 132 in the main program.

Figure 10A:
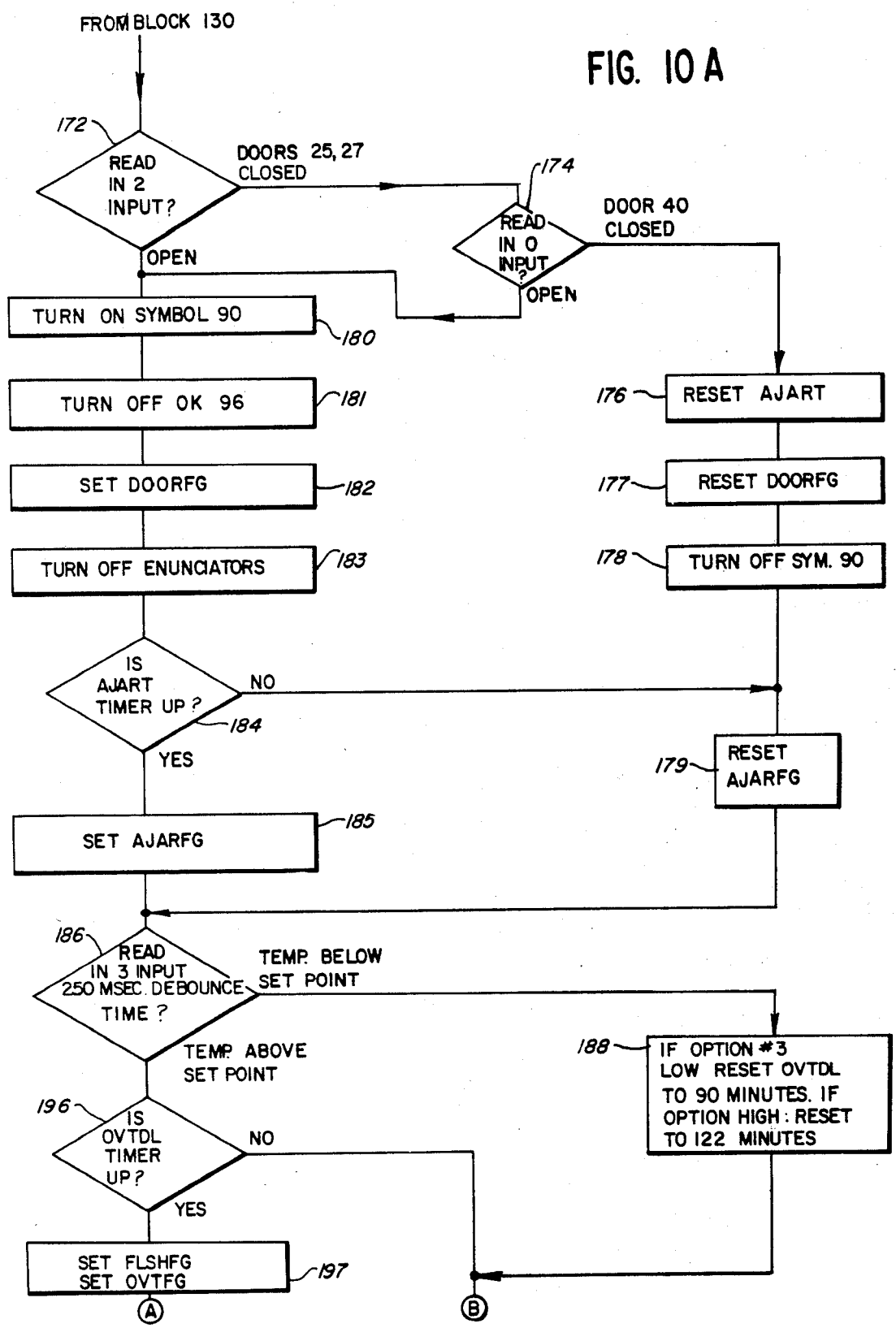
FIGS. 10A and 10B comprise a single flow chart, when joined along similarly lettered lines, of a portion of the control program performed by the block 132 of FIG. 7.
Figure 10B:
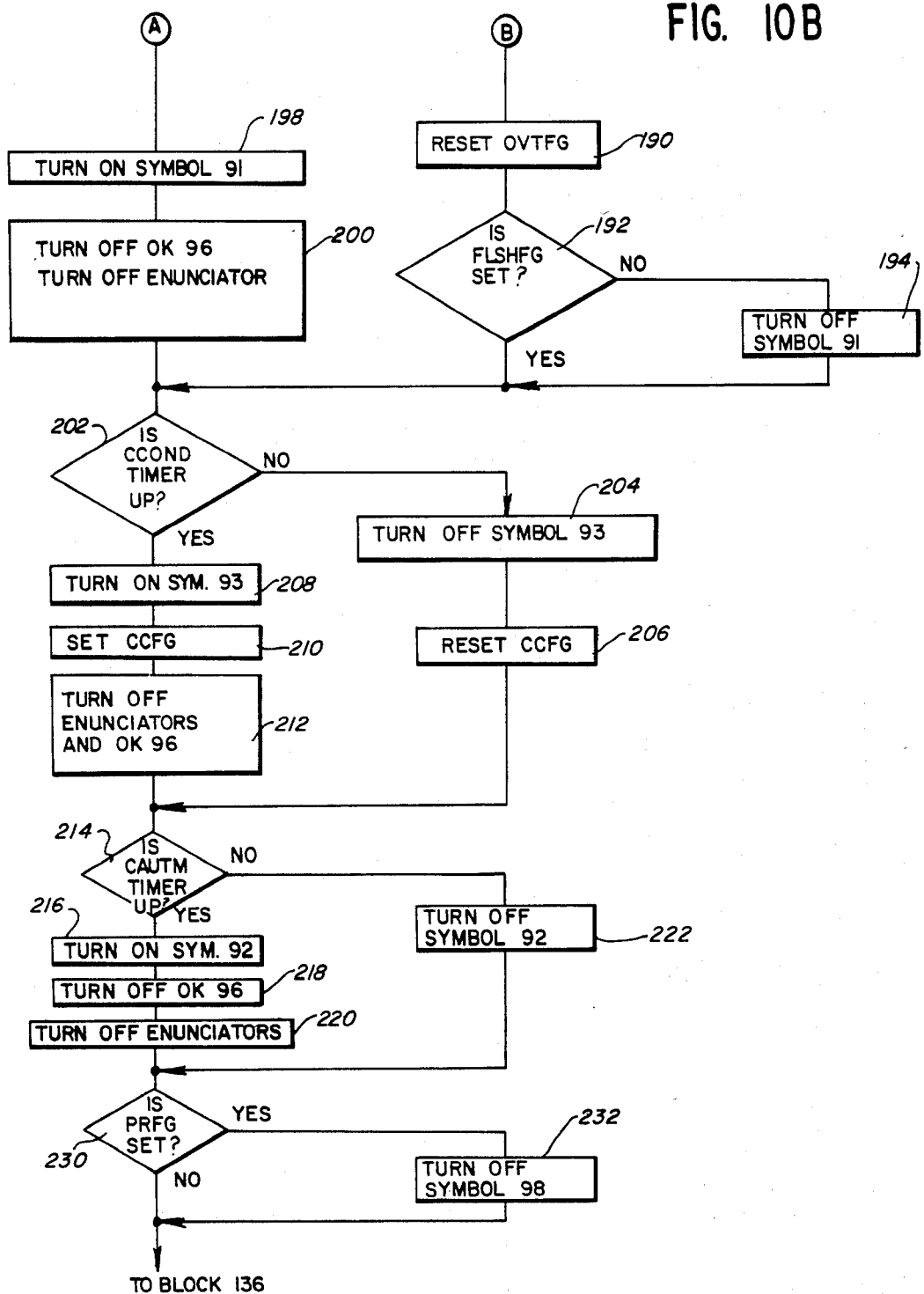

Referring now to FIGS. 10A and 10B, the lights subroutine will now be described in detail. Immediately following the block 130, a pair of blocks 172 and 174 determine whether the doors 25, 27 or 40 are closed by checking the status of the IN0 and IN2 inputs to the microcomputer 70. It should be noted that, unless otherwise indicated, approximately 250 msec. of debounce time is provided for each of the switches 52, 54, 56 and 66, i.e., a switch must be actuated for 250 msec. for any change to be noted by the control program.

If all the doors 25, 27 and 40 are closed, then the door ajar timer AJART and the door open flag DOORFG are reset by a pair of blocks 176 and 177. The door ajar symbol 90 is then turned off by a block 178 and the door ajar alarm flag AJARFG is reset by a block 179.

If the blocks 172 and 174 determine that either or both of the inputs IN0 and IN2 are high, indicating that at least one of the doors 25, 27 or 40 is open, then a block 180 energizes the door ajar symbol 90 via the outputs L0–L7 and a block 181 turns off the OK indicator 96. At this time the door open flage DOORFG is set by a block 182 and the particular enunciator symbol 80–83 which is energized is turned off by a block 183.

Following the block 183 is the block 184 which determines whether the door ajar timer AJART has expired. If so, then the door ajar flag AJARFG is set by a block 185, and if not, then the ajar flag AJARFG is reset by the block 179.

Following the blocks 179 and 185 is a decision block 186 which determines whether the temperature within the fresh food compartment 24 is above or below the set point. The block 186 provides 250 msec. of debounce time for the switching of the temperature sensing circuit 79 so as to minimize noise effects which may cause an erroneous indication to be generated. The input IN3 is sensed by the block 186 and if the status of the input is unchanged over a 250 msec. interval indicating that the temperature is below the set point, the overtemperature delay timer OVTDL is reset to the value selected by the OPTN3 input, i.e. 90 or 122 minutes. A block 190, FIG. 10A, then resets the overtemperature flag register OVTFG.

A decision block 192 follows the block 190 and determines whether the flashing overtemperature indicator flag FLSHFG is set. If not, the overtemperature symbol 91 is de-energized by a block 194. If the block 192 determines the FLSHFG is set, the block 194 is bypassed.

If the block 186, FIG. 10A, determines that the temperature within the fresh food compartment 24 is above the set point, then a block 196 determines whether the overtemperature delay timer OVTDL has expired. If the timer has not expired, then control passes to the blocks 190, 192 and 194. If the overtemperature time delay period has expired, control passes to a block 197 which sets the flag registers FLSHFG and OVTFG. A block 198, FIG. 10B, then energizes the overtemperature symbol 91 and a block 200 de-energizes the OK symbol 96 and the enunciators.

Following the blocks 200 and 192 or 194 is a decision block 202 which determines whether the check condenser timer CCOND has expired. If this is not found to be the case, then a block 204 de-energizes the check condenser symbol 93 and a block 206 resets the check condenser flag CCFG.

If the block 202 determines that the timer CCOND has expired, then three blocks 208, 210 and 212 turn on the check condenser symbol 93, set the check condenser flag CCFG and turn off the OK symbol 96 and the enunciators.

Following the block 212 is a decision block 214 which determines whether the alert timer has expired. As before noted, the alert timer CAUTM is set to 10 hours and is the delay period before which the alert symbol 92 is energized while a door-open or an overtemperature condition exists within the refrigerator 20. If the block 214 determines that the alert timer CAUTM has expired, a series of blocks 216, 218 and 220 energize the alert symbol 92 and de-energize the OK symbol 96 and the enunciators 80–83.

If the alert timer CAUTM has not expired, a block 222 de-energizes the alert symbol 92 and control passes to a block 230.

The block 230 then determines whether the power interruption flag PRFG is set, and if this is the case, a block 232 changes the contents of register 111 to de-energize the power interruption symbol 98. Control then passes to the block 136, FIG. 7.

If the power interruption flag PRFG has not been set, then the block 232 is bypassed and control passes to block 136 in the main program.

The next block in the main program, FIG. 7, is the block 136 which determines whether one second has elapsed since the series of "fast" loops has begun. If this is the case, control passes to the ajar and alarm subroutines.

Figure 11:
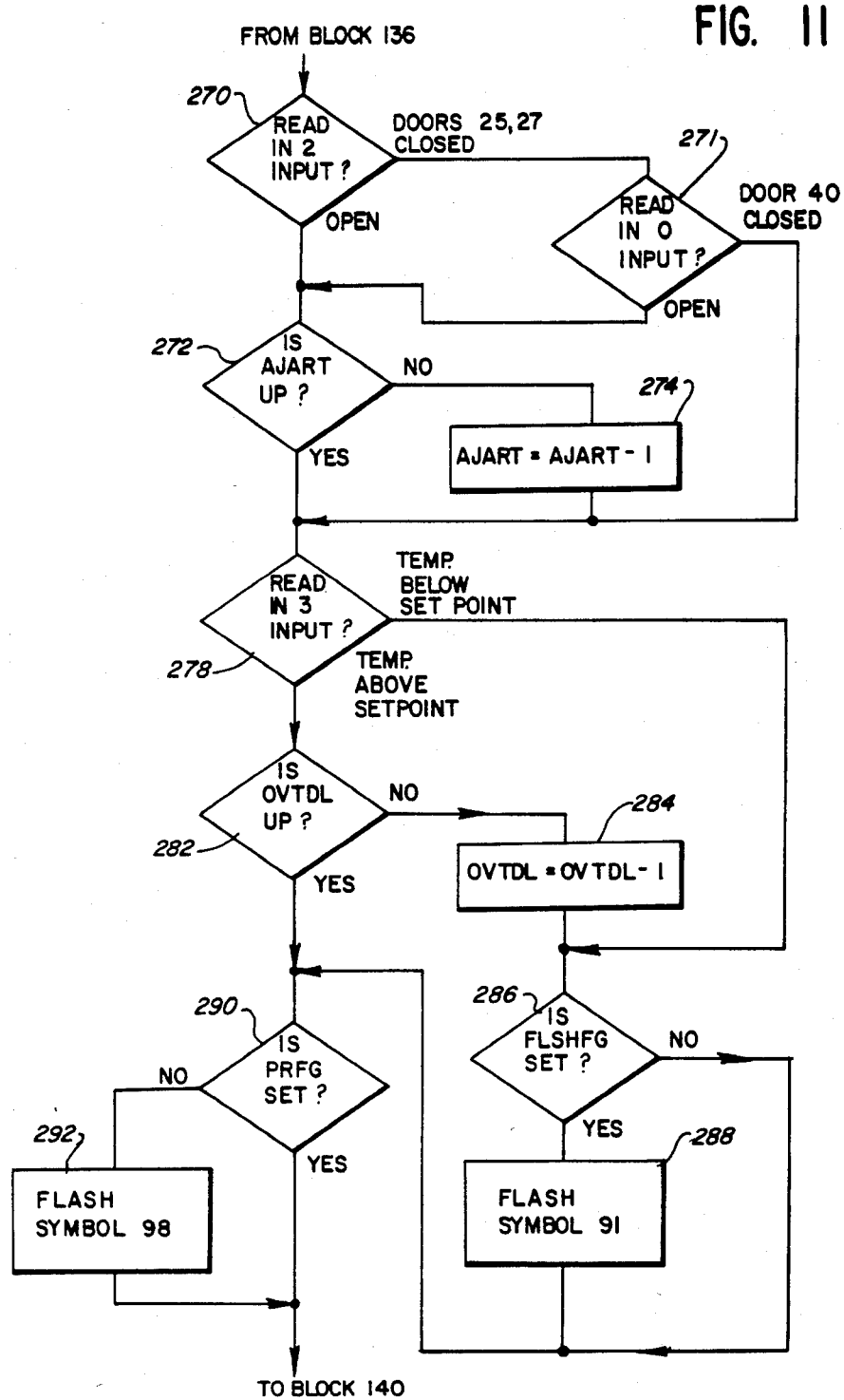
FIG. 11 is a flow chart of a portion of the control program performed by the block 138 of FIG. 7.

Referring to FIG. 11, the ajar subroutine is initiated at a pair of blocks 270 and 271 which sense the status of the signals coupled to the IN0 and IN2 inputs in order to determine whether any of the doors 25, 27 or 40 are open. If one or more of the doors are open, a decision block 272 reads the contents of the door ajar timer AJART in order to determine whether a door has been open for three consecutive minutes. If the ajar timer AJART has not expired, the value stored therein is decremented by a block 274.

A decision block 278 follows the blocks 271, 272 and 274 and reads the status of the IN3 input to determine whether an overtemperature condition exists. If this is the case, control is passed to a block 282 which determines whether the OVTDL timer register has expired.

If the OVTDL timer register has not expired, a decision block 284 decrements the value stored therein and control passes to a block 286 which determines whether the flashing overtemperature indicator flag FLSHFG is set. If so, a block 288 changes the contents of the output register 111 to cause the overtemperature symbol 91 to be flashed on and off at one second intervals.

If it is determined by the block 278 that the airspace temperature within the fresh food compartment 24 is below the set point, then control passes directly to the block 286.

Following the blocks 282 and 286 or 288 is a decision block 290 which determines whether the power interruption flag PRFG has been set. If PRFG has not been set, then a block 292 flashes the power outage symbol 98 at one second intervals. If PRFG has been set, the block 292 is skipped and control passes directly to the alarm subroutine.

Figure 12A:
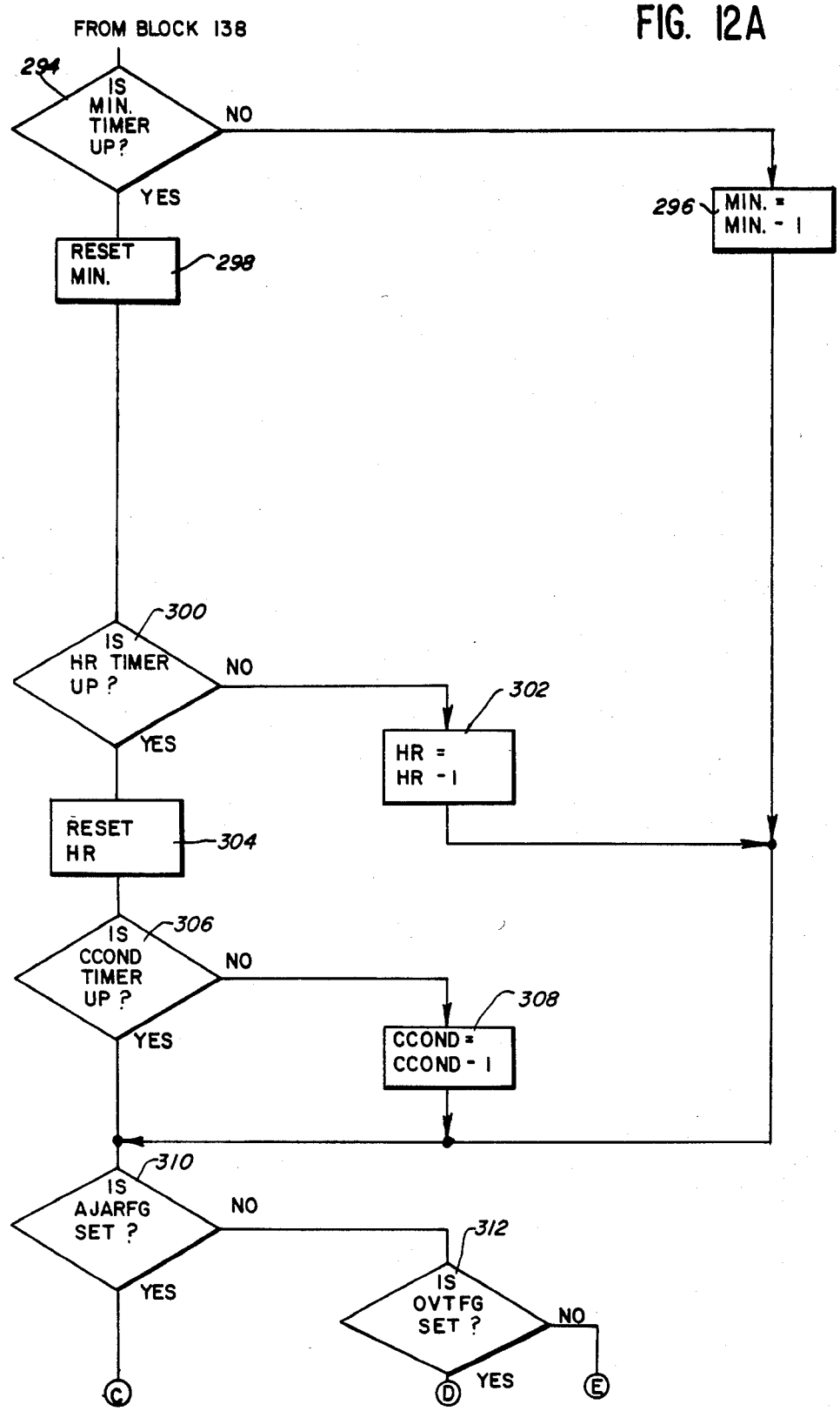
FIGS. 12A and 12B comprise a single flow chart, when joined along similarly lettered lines, of a portion of the control program performed by the block 140 of FIG. 7.
Figure 12B:
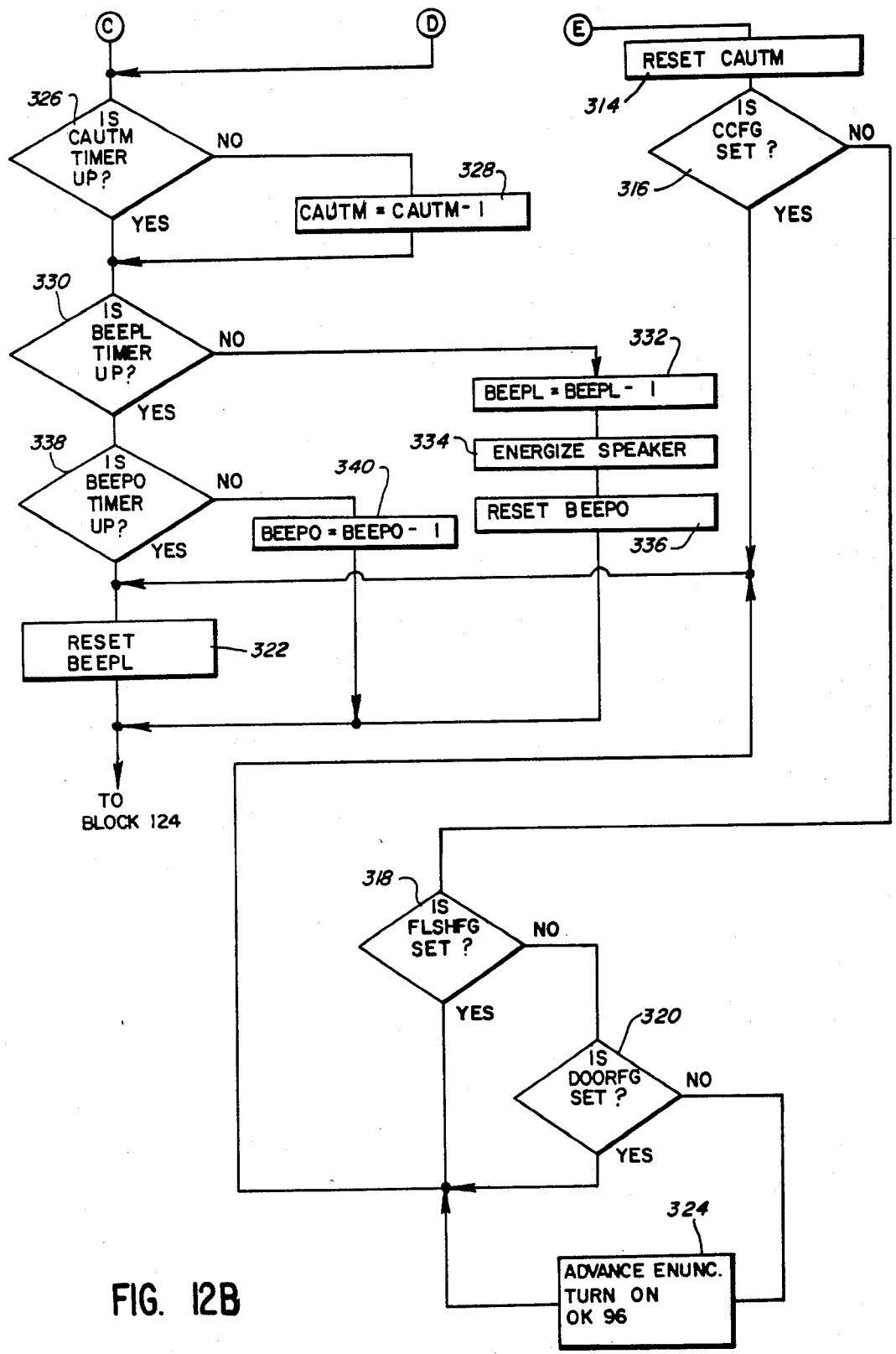

Referring now to FIGS. 12A and 12B, the alarm subroutine performed by the block 140 in the main program is illustrated in detail. A block 294 reads the contents of the minute timer register MIN, and if it has not expired, a block 296 decrements the contents thereof by one second. If the MIN timer has expired, it is reset in a block 298.

Assuming that the MIN timer has expired, the hour timer HR is tested in a block 300, and if it has not expired, it is decremented by a block 302. If the hour timer has expired, it is reset by a block 304.

Following block 304 is a decision block 306 which reads the contents of the CCOND timer register and, if it has not expired, the value stored therein is decremented by a block 308. Control passes to a block 310 if the timer CCOND has expired, or following the blocks 296, 302 or 308.

The block 310 determines whether the door ajar flag AJARFG is set. If this is not the case, a block 312 determines whether the overtemperature flag OVTFG has been set. If this is also not the case, a block 314, FIG. 12B, resets the alert delay timer CAUTM and a block 316 determines whether the check condenser flag CCFG is set. If CCFG is not set, a decision block 318 determines whether the flashing overtemperature flag FLSHFG is set.

If FLSHFG is set, or if it is not set and the door open flag DOORFG is set, as determined by the block 320, then no condition requiring the audible sequence exists and control passes to a block 322 which resets the value stored in the BEEPL register. As previously noted, the BEEPL register stores the number of consecutive beeps in an audible sequence.

If it is determined by the block 320 that the door open flag DOORFG has not been set then no symbols other than the OK symbol should be on, and a block 322 advances the energization of the enunciators 80-83 from left to right and energizes the OK symbol 96. At this time, the enunciators are checked to insure that only one is energized at any particular time. Control from the block 324 then passes to the block 322.

If the block 316 determines that the check condenser flag CCFG has been set, then the blocks 318, 320 and 324 are skipped and control passes to the block 322.

If either of the blocks 310 or 312, FIG. 12A, determine that AJARFG or OVTFG have been set, then a block 326, FIG. 12B, checks the value stored in the alert delay timer CAUTM, and if it has not expired, the value stored therein is decremented in a block 328.

Following the block 326 or 328 is a block 330 which checks the value of the BEEPL timer in order to determine whether it has been decremented to zero, which condition initiates the audible sequence. If the BEEPL timer has not been decremented to zero, then a block 332 decrements the value stored therein and a block 334 energizes the speaker 60 with a 2,500 hertz signal of 80 msec. duration. As previously noted, the block 334 will energize the speaker a total of 8 times during an audible sequence, a single beep occurring each time the block 334 is encountered during the course of a program execution.

Following the block 334 is a block 336 which resets the value stored in the BEEPO timer, which as before noted, stores the delay period between consecutive audible sequences.

If the block 330 determines that the BEEPL timer has been decremented to zero, then a block 338 checks the value stored in the BEEPO timer to determine whether it has expired. If not, a block 340 decrements the value stored therein. If the BEEPO timer has expired, control passes to the block 322.

Control from any of the blocks 322, 336 or 340 returns to block 124 in the main program, FIG. 7.

Figure 13A:
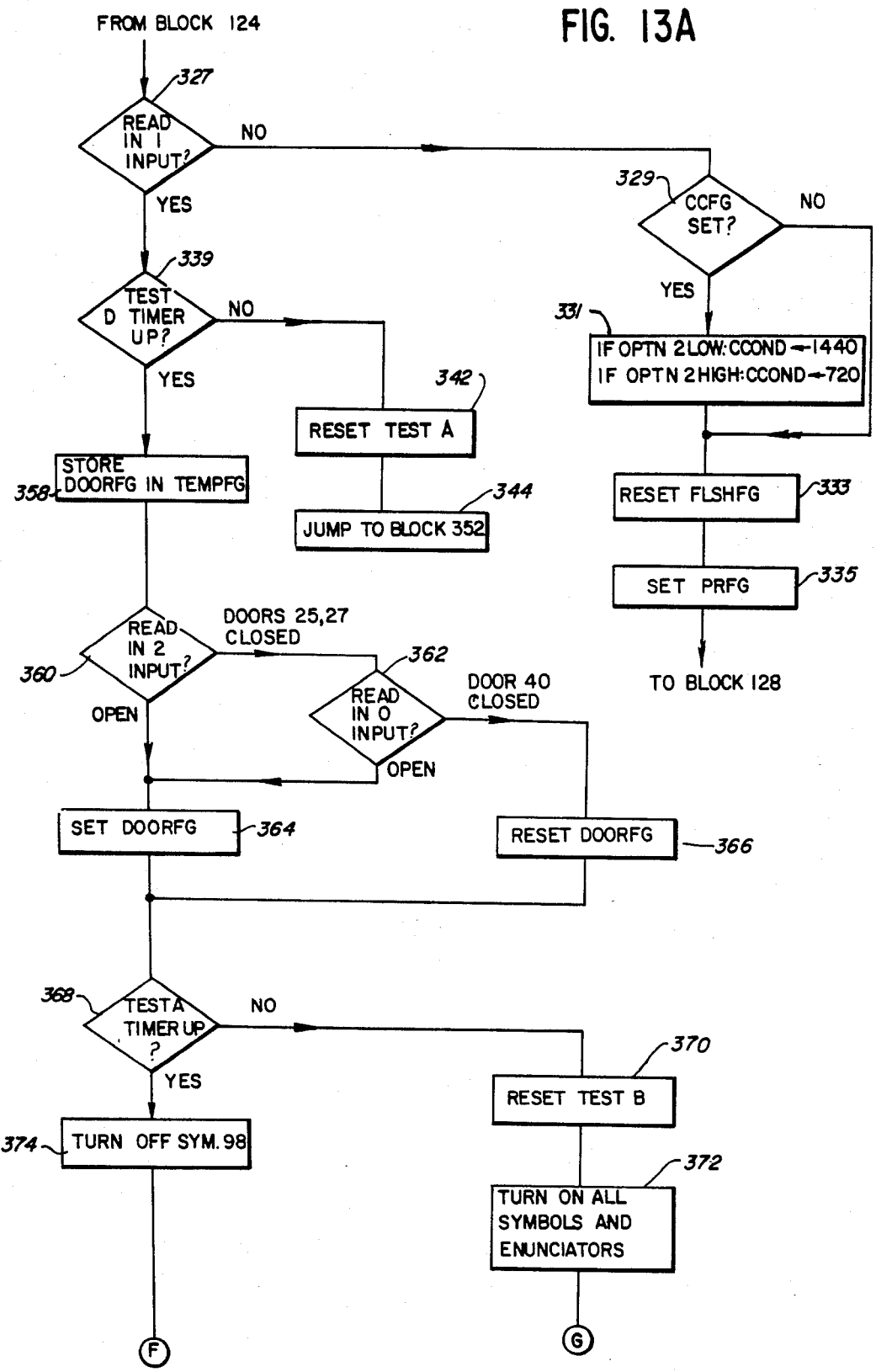
FIGS. 13A, 13B and 13C comprise a single flow chart, when joined along similarly lettered lines, of a portion of the control program performed by the block 126 of FIG. 7.
Figure 13B:
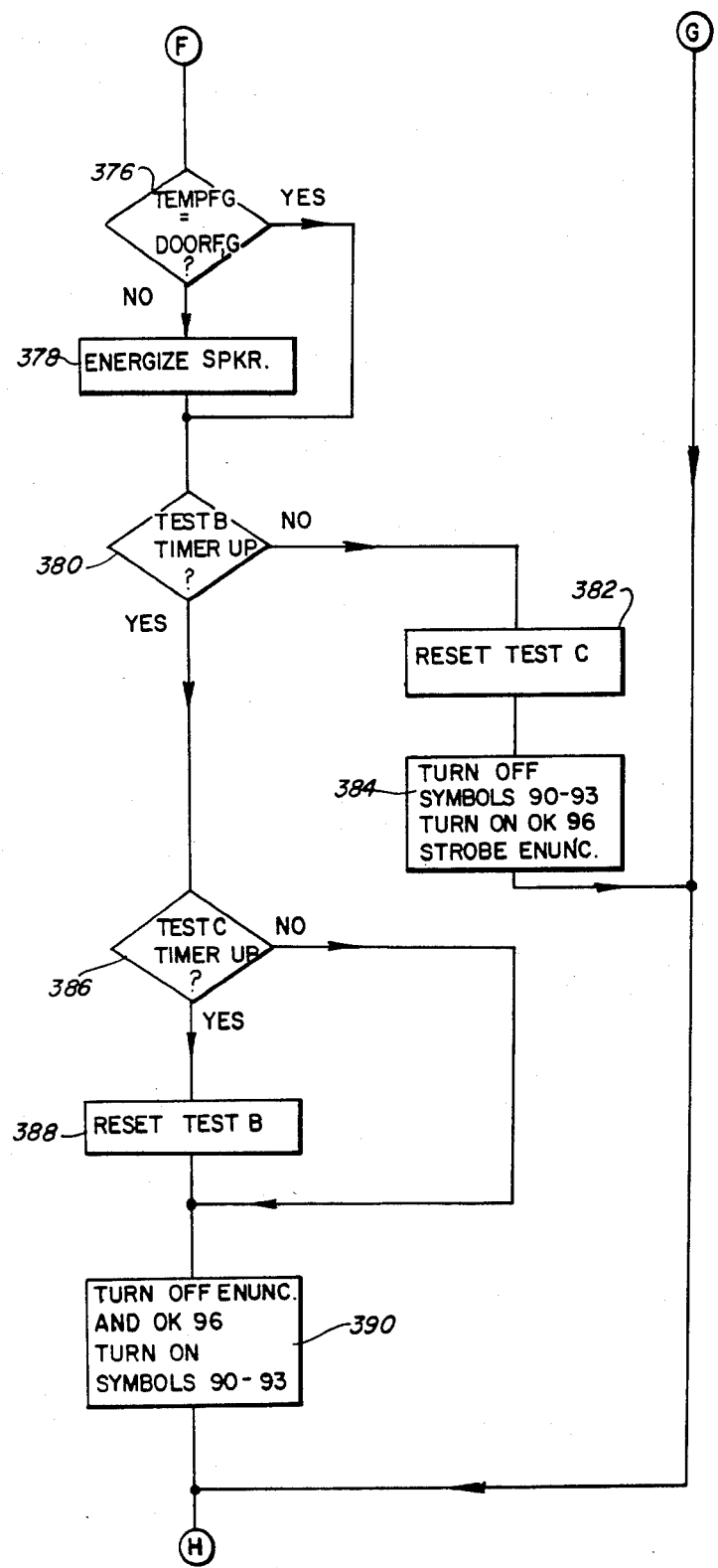
Figure 13C:
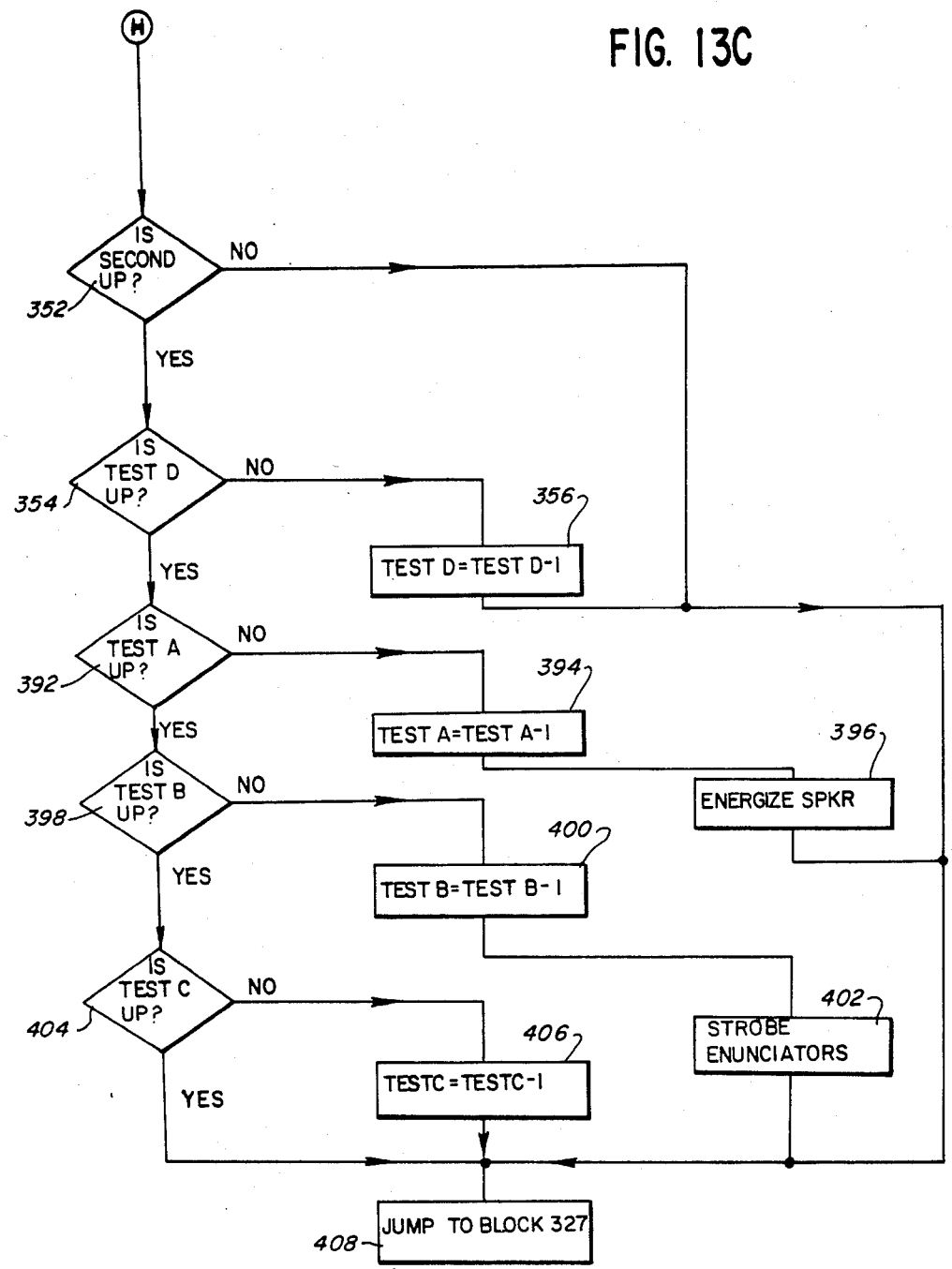

Referring now to FIGS. 13A, 13B and 13C, the test subroutine is illustrated in detail. A block 327 determines whether the TEST mode has been selected by reading the input IN1. If the status of this input indicates that the auto scan switch 66 is not in the reset position, then a series of blocks 329–335 reinitialize the check condenser timer CCOND if the check condenser flag CCFG is set and reset the flag FLSHFG and set the flag PRFG. Control from the block 335 then passes directly to the block 128 which resets the TEST mode initiate delay timer TEST D. The control program then resumes cycling through the various subroutines in the NORMAL mode.

If the block 327 determines that the test switch is in the reset position, then a block 339 reads the contents of the TEST mode initiate delay timer TEST D to determine whether it has expired. As previously mentioned, the TEST D register is initialized at a value of two seconds, and hence, the TEST mode functions do not occur until this initial delay has elapsed. This allows switch 66 to be toggled rapidly to reset the system without starting the TEST mode. If this delay period has not elapsed, then the TEST mode countdown timer TEST A is redundantly reinitialized to eight seconds and control is passed to a block 352, FIG. 13C, which determines whether a second has elapsed. If this is not the case, control passes back to the block 327 as shown in FIG. 13A.

If one second has elapsed as determined by the block 352, see FIG. 13C, a block 354 then determined whether the TEST D register has expired. If not, the TEST D register is decremented and control is returned to the block 327. Once control has cycled through the test subroutine for a period of two seconds since the time the auto scan switch 66 was moved to the reset position, control passes from the block 339, FIG. 13A, to a block 358 which stores the value of DOORFG in the temporary register TEMPFG. The door switches 52, 54 and 56 are then sensed to determine whether any of the doors 25, 27 or 40 are open. If this is the case, the door open flag DOORFG is set by a block 364. If all of the doors 52, 54 and 56 are closed, DOORFG is reset by a block 366.

Following the blocks 364 and 366 is a decision block 368 which determines whether the TEST A timer has expired. If the TEST A timer has not expired, control passes to a pair of blocks 370 and 372 which turn on all display characters and enunciators and which reset the value stored in the TEST B register to 15 seconds. The value stored in the TEST B register in the length of time the OK symbol 96 is energized while the enunciators 80-83 are strobed during the test subroutine.

Control from the block 372 then passes to the block 352, FIG. 13C, to continue the test subroutine.

Once the TEST A timer has expired, control is passed from block 368 to a block 374, which de-energizes the power outage symbol 98. A decision block 376, FIG. 13B, then compares the value stored in the DOORFG register against the value stored by the block 358 in the TEMPFG register. If the values are different, this indicates that one of the doors 25, 27 or 40 has been opened while the remaining doors are closed. Consequently, a block 378 energizes the speaker 60 with a 2500 hertz signal of 80 milliseconds duration. Control then passes to a block 380. If the block 376 determines that the value stored in the TEMPFG and DOORFG registers are the same, then the speaker is not energized and control passes directly to the block 380.

The block 380 then reads the contents of the TEST B register and if it has not expired, then the value stored in the TEST C register is reinitialized and the OK symbol 96 is continuously energized and the enunciators 80-83 are strobed. Control then passes to the block 352.

Once the TEST B timer has expired, control passes to a decision block 386 which reads the value of the TEST C timer. If the timer has expired, then a block 388 resets the value in the TEST B timer to 15 seconds. During the time the TEST C timer is running, only the four symbols 90-93 are energized and the remaining indicators are de-energized.

If the TEST C timer has not expired, the TEST B timer is not reinitialized and control passes to a block 390 which insures that only the symbols 90-93 are energized. Control from the block 390 then passes directly to the block 352.

Following the block 354, see FIG. 13C, is a decision block 392 which determines whether the TEST A timer has expired. If it has not, a block 394 decrements the value stored therein and a block 396 energizes the speaker 60 to cause an audible tone to be generated thereby.

If the TEST A timer has expired, then a block 398 determines whether the TEST B timer has expired. If this is not the case, then the TEST B timer is decremented and the enunciators are sequentially energized.

If the TEST B register has expired, a block 404 determines whether the TEST C timer has expired. If not, the value stored therein is decremented by a block 406.

Figure 14:
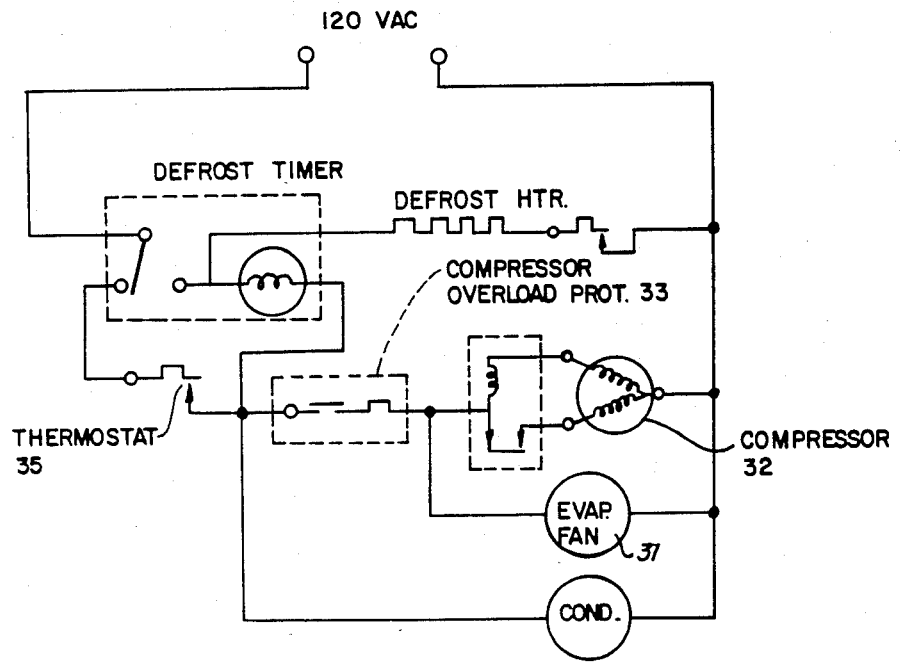
FIG. 14 is a simplified schematic diagram of the refrigerator component wiring.

Referring now to FIG. 14, there is illustrated a simplified schematic diagram of the electrical connections to the various components of the refrigerator. In particular, there is illustrated the electrical interconnections between the compressor 32, an evaporator fan 31, a conventional compressor overload protector 33 and a thermostat 35.

The thermistor 48, as previously mentioned, is responsive to the air being circulated within the fresh food compartment and temperatures of 60° F. or above are designated as an overtemperature condition. Since the temperature sensor is not directly responsive to the air temperature within the freezer compartment 26, the control circuitry of the refrigerator has been modified to prevent the freezer temperature from rising rapidly in the event of a compressor failure that causes the overload protector 33 to trip.

In conventional refrigerators, the evaporator fan 31 is connected in series with the thermostat 35 such that the fan 31 would operate whenever the thermostat calls for cooling even though the compressor 32 had failed. Under such a condition, the colder air from the freezer compartment 26 would be circulated throughout the refrigerator 20, maintaining the fresh food compartment 24 below the trip point of the temperature sensing circuit 79 while allowing the temperature of the freezer compartment 26 to rise to an undesirable level.

To prevent this condition from occurring, the evaporator fan 31 is wired directly in parallel with the compressor 32, with both elements being connected in series with the compressor overload protector 33. In this manner, both the compressor 32 and the evaporator fan 31 are deenergized whenever the compressor fails and trips the overload protector 33. By connecting the evaporator fan directly in parallel with the compressor, air circulation is stopped any time the compressor fails. This reduces the rate at which the temperature within the freezer compartment 26 rises and the trip point of the temperature sensing circuit 79 will be reached quickly, allowing the sensing and display system to indicate an overtemperature condition caused by the compressor malfunction before the freezer temperature has risen to an undesirably high level. Consequently, the user is alerted to the overtemperature condition much sooner than would be possible in conventional refrigerator systems.

Having described the invention, the embodiments of the invention in which an exclusive property or privilege is claimed are defined as follows:

1. In a refrigeration apparatus having means defining a refrigerated space and cooling means for cooling the air within said refrigerated space, a sensing and display system comprising:
   display means including an electrically energizable visual indicator;
   sensing means connected to said refrigeration apparatus and arranged to provide a signal indicating a predetermined operating condition of said apparatus; and,
   electronic signal processing means coupled to said display means and to said sensing means, said signal processing means including means operative at a first rate and responsive to said sensing means for repetitively determining in a continuous manner during an interval whether said predetermined operating condition exists and means operative at a second rate slower than said first rate for energizing said indicator to indicate that said predetermined operating condition exists.

2. The sensing and display system of claim 1 wherein said display means includes first and second visual indicators and said electronic signal processing means is operative to energize said first indicator when said predetermined operating condition exists and energize said second indicator when said predetermined operating condition does not exist.

3. The refrigeration apparatus of claim 2 wherein said sensing means comprises a plurality of condition responsive sensors, including a temperature sensor exposed to the air within said space.

4. The refrigeration apparatus of claim 3 wherein said means operative at a first rate comprises means for sequentially scanning said condition responsive sensors and said signal processing means further includes means for delaying the response to said temperature sensor until a sensed temperature condition has existed for a predetermined interval.

5. In a refrigeration apparatus having means defining a refrigerated space and cooling means for cooling the air within said refrigerated space, a sensing and display system comprising:
   display means including a plurality of electrically energizable visual indicators;
   a plurality of sensing means connected to said refrigeration apparatus, each sensing means arranged to provide an output signal indicating a predetermined operating condition; and
   electronic signal processing means having a plurality of inputs coupled to said sensing means and a plurality of outputs connected to said display means, said signal processing means including
      means operative at a first rate for repetitively scanning said inputs in a continuous manner during an interval and storing signals representing the status thereof;
      means operative at a second rate slower than said first rate and responsive to said status signals for timing the duration of at least one of said sensed conditions and energizing said display means to indicate the sensed operating condition of said apparatus.

6. The refrigeration apparatus of claim 5 wherein said means operative at a first rate operates repetitively for a predetermined period, following which said means operative at a second rate operates once.

7. In a refrigeration apparatus having means defining a refrigerated space and cooling means for cooling the air within said space, a temperature sensing and display system, comprising:
   a temperature sensor arranged to sense the temperature within said refrigerated space;
   a temperature sensing circuit coupled to said temperature sensor and operative to provide an output signal at a predetermined temperature to signal the occurrence of an overtemperature condition;
   electrically energizable indicator means mounted on said apparatus; and
   electronic signal processing means coupled to said temperature sensing circuit and said indicator means, including
      timing means for timing a predetermined time interval;
      means responsive to said timing means and to said temperature sensing circuit for energizing said indicator means in a first mode if an overtemperature condition exists throughout said time interval; and,
      means operative in response to the discontinuance of said overtemperature condition while said indicating means is energized in said first mode for energizing said indicating means in a second mode.

8. The refrigeration apparatus of claim 7, further including means for resetting said timing means in response to the discontinuance of said sensed overtemperature condition during said time interval.

9. The refrigeration apparatus of claim 7 wherein said timer comprises a counter having a count that is varied at a fixed rate during the time said temperature sensing circuit of an overtemperature condition and said indicator means is energized when the count reaches a predetermined number.

10. The refrigeration apparatus of claim 7 wherein said indicator means comprises a visual indicator, and said first mode of energization comprises continuous energization and said second mode of energization comprises pulsed energization.

11. In a refrigeration apparatus having means defining a refrigerated space and cooling means for cooling the air within said space, a temperature sensing and display system, comprising:
   a temperature sensor arranged to sense the temperature of said refrigerated space;
   a temperature sensing circuit coupled to said temperature sensor and operative to provide an output indicating whether the sensed temperature is above or below a predetermined temperature;
   electrically energizable indicator means mounted on said appartus, including a first visual display element and a second visual display element;
   electronic control means coupled to said temperature sensing circuit and to said first and second display elements, including means for energizing said first element during periods when the sensed temperature is below said predetermined temperature and means for de-energizing said first display element and energizing said second display element when the sensed temperature has been above said predetermined temperature for more than a preselected time interval.

12. The refrigeration apparatus of claim 11 wherein said electronic control means includes means for energizing said second display element in a first mode when the sensed temperature is above said predetermined temperature and means for energizing said second display element in a second mode different from said first mode after the sensed temperature drops below said predetermined temperature.

13. The refrigeration apparatus of claim 12 wherein one of said first and second modes comprises continuous energization and the other of said modes comprises pulsed energization.

14. The refrigeration apparatus of claim 11 further including an audible alarm device, and wherein said electronic control means includes means for energizing said audible alarm device when the sensed temperature has been above said predetermined temperature for a period of time greater than said preselected time interval.

15. The refrigeration apparatus of claim 11 wherein said electronic control means includes means for varying said preselected time interval.

16. In a refrigeration apparatus having means defining a refrigerated space and cooling means for cooling the air within the refrigerated space, a sensing and display system comprising:
   display means including a plurality of electrically energizable visual indicators;

a plurality of sensing means connected to the refrigeration apparatus, each sensing means arranged to provide an output signal indicating a predetermined operating condition; and electronic signal processing means having a plurality of inputs coupled to the sensing means and a plurality of outputs connected to the display means, the electronic signal processing means including means continuously operative at a first rate during an interval for repetitively scanning the inputs and storing signals representing the status thereof and means operative at a second rate slower than the first rate and responsive to the status signals for energizing the display means to indicate the sensed operating condition of the apparatus at the end of the interval.

* * * * *